United States Patent
Rapaka et al.

(10) Patent No.: US 9,883,184 B2
(45) Date of Patent: *Jan. 30, 2018

(54) QP DERIVATION AND OFFSET FOR ADAPTIVE COLOR TRANSFORM IN VIDEO CODING

(71) Applicant: QUALCOMM Incorporated, San Diego, CA (US)

(72) Inventors: Krishnakanth Rapaka, San Diego, CA (US); Li Zhang, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 14/876,574

(22) Filed: Oct. 6, 2015

(65) Prior Publication Data

US 2016/0100167 A1    Apr. 7, 2016

Related U.S. Application Data

(60) Provisional application No. 62/061,099, filed on Oct. 7, 2014, provisional application No. 62/064,347, filed on Oct. 15, 2014.

(51) Int. Cl.
| | |
|---|---|
| *H04N 7/12* | (2006.01) |
| *H04N 19/124* | (2014.01) |
| *H04N 19/186* | (2014.01) |
| *H04N 19/44* | (2014.01) |
| *H04N 19/18* | (2014.01) |

(Continued)

(52) U.S. Cl.
CPC .......... *H04N 19/124* (2014.11); *H04N 19/12* (2014.11); *H04N 19/176* (2014.11); *H04N 19/18* (2014.11); *H04N 19/186* (2014.11); *H04N 19/44* (2014.11); *H04N 19/60* (2014.11)

(58) Field of Classification Search
CPC .... H04N 19/124; H04N 19/12; H04N 19/176; H04N 19/18; H04N 19/186; H04N 19/44; H04N 19/60

See application file for complete search history.

(56) References Cited

U.S. PATENT DOCUMENTS 9,020,294 B2 * 4/2015 Leontaris ................ G06T 5/002
                                                        375/240.12
9,161,046 B2    10/2015 Van der Auwera et al.
(Continued)

OTHER PUBLICATIONS

International Preliminary Report on Patentability from International Application No. PCT/US2015/054488, dated Jan. 17, 2017, 9 pp.
(Continued)

*Primary Examiner* — Nhon Diep

(57) ABSTRACT

A device for decoding video data is configured to determine for one or more blocks of the video data that adaptive color transform is enabled; determine a quantization parameter for the one or more blocks; in response to a value of the quantization parameter being below a threshold, modify the quantization parameter to determine a modified quantization parameter; and dequantize transform coefficients based on the modified quantization parameter.

28 Claims, 14 Drawing Sheets

(51) Int. Cl.
  *H04N 19/176* (2014.01)
  *H04N 19/60* (2014.01)
  *H04N 19/12* (2014.01)

(56) References Cited

U.S. PATENT DOCUMENTS

| | | | | |
|---|---|---|---|---|
| 9,225,988 | B2* | 12/2015 | Tourapis | H04N 19/70 |
| 9,420,305 | B2* | 8/2016 | Lakshman | H04N 19/61 |
| 9,485,502 | B2* | 11/2016 | Xu | H04N 19/70 |
| 9,516,315 | B2* | 12/2016 | Tan | H04N 19/147 |
| 9,779,687 | B2* | 10/2017 | Park | G09G 5/006 |
| 2005/0259730 | A1* | 11/2005 | Sun | H04N 11/042 375/240.03 |
| 2013/0188693 | A1 | 7/2013 | Xu et al. | |
| 2016/0100168 | A1 | 4/2016 | Rapaka et al. | |
| 2016/0261864 | A1* | 9/2016 | Samuelsson | H04N 19/44 |
| 2017/0127058 | A1* | 5/2017 | Misra | H04N 19/105 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen, et al., "Description of screen content coding technology proposal by Qualcomn", JCT-VC Meeting; Valencia, Mar. 27-Apr. 4, 2014; (Joint Collaborative Team on Video Coding of ISO/IEC JTC1/SC29/WG11 and ITU-T SG.16), No. JCTVC-Q0031, Mar. 18, 2014, XP030115915, 18 pp.

Joshi, et al., "High Efficiency Video Coding (HEVC) Screen Content Coding: Draft 1 ," JCT-VC Meeting; Jun. 30-Jul. 9, 2014; (Joint Collaborative Team on Video Coding of ISO/IEC JTC1/SC29/WG11 and ITU-T SG.16); No. JCTVC-R1005_v2, Aug. 23, 2014, 362 pp. [uploaded in parts].

Li, et al., "On residual adaptive colour transform", JCT-VC Meeting; Oct. 17-24, 2014; Strasbourg; (Joint Collaborative Team on Video Coding of ISO/IEC JTC1/SC29/WG11 and ITU-T SG.16); URL: http://wftp3.itu.int/av-arch/jctvc-site/, No. JCTVC-S0086, Oct. 8, 2014, XP030116829, 15 pp.

Misra, et al., "On Transform Coefficient Scaling for Adaptive Colour Transform", JCT-VC meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/, No. JCTVC-S0140-v3, Oct. 15, 2014; XP030116907, 3 pp.

Rapaka, et al., "Qp Derivation for Adaptive Color Transform", JCT-VC Meeting; Oct. 17-24, 2014; Strasbourg; (Joint Collaborative Team on Video Coding of ISO/IEC JTC1/SC29/WG11 and ITU-T SG.16); URL: http://wftp3.itu.int/av-arch/jctvc-site/, No. JCTVC-S0144, Oct. 8, 2014, XP030116913, 4 pp.

"Text of ISO/IEC 14496-10/FDAM1 AVC Fidelity Range Extensions," Mpeg Meeting; Jul. 2014; Redmond; (Motion Picture Expert Group or ISO/IEC JTC1/SC29/WG11),, No. N6539, XP030013382, ISSN: 0000-0351, 138 pp.

Yu, et al., "Common Conditions for Screen Content Coding Test," Joint Collaboration Team of Video Coding, ITU-T SG 16 WP 3 and ISO/IEC JTC 1/SC 29/WG 11, Jun. 30-Jul. 9, 2014, Document JCTVC-R1015, 5 pp.

Zhang, et al., "SCCE5 Test 3.2.1: In-loop color-space transform", JCT-VC Meeting; Jun. 30-Jul. 9, 2014; Sapporo; (Joint Collaborative Team on Video Coding of ISO/IEC JTC1/SC29/WG11 and ITU-TSG.16 ); URL: http://wftp3.itu.int/av-arch/jctvc-site/, No. JCTVC-R0147, Jun. 20, 2014; XP030116426, 5 pp.

ITU-T H.223, Series H: Audiovisual and Multimedia Systems, Infrastructure of audiovisual services—Transmission mutiplexing and synchronization, Multiplexing protocol for low bit rate multimedia communication, The International Telecommunication Union. Jul. 2001, 74 pp.

Wang, et al., "High Efficiency Video Coding (HEVC) Defect Report 2," JCT-VC Meeting; Oct. 23-Nov. 1, 2013; (Joint Collaborative Team on Video Coding of ISO/IEC JTC1/SC29/WG11 and ITU-TSG.16 ); No. JCTVC-O1003_v2, Nov. 24, 2013; 311 pp.

Flynn, et al., "High Efficiency Video Coding (HEVC) Range Extensions text specification: Draft 7," JCT-VC Meeting; Mar. 27-Apr. 4, 2014; (Joint Collaborative Team on Video Coding of ISO/IEC JTC1/SC29/WG11 and ITU-TSG.16 ); No. JCTVC-Q1005_v4, Apr. 10, 2014; 376 pp.

Joshi, et al., "High Efficiency Video Coding (HEVC) Screen Content Coding: Draft 1," JCT-VC Meeting; Jun. 30-Jul. 9, 2014; (Joint Collaborative Team on Video Coding of ISO/IEC JTC1/SC29/WG11 and ITU-TSG.16 ); No. JCTVC-R1005_v3, Sep. 27, 2014, 362 pp.

Joshi, et al., "High Efficiency Video Coding (HEVC) Screen Content Coding: Draft 4," JCT-VC Meeting; Jun. 19-26, 2015, (Joint

(56) References Cited

OTHER PUBLICATIONS

Collaborative Team on Video Coding of ISO/IEC JTC1/SC29/WG11 and ITU-TSG.16 ); No. JCTVC-U1005_v1; Sep. 5, 2015, 667 pp.
"Parameter values for the HDTV standards for production and international programme exchange," Recommendation ITU-R BT.709-6, International Telecommunication Union, Jun. 2015, 19 pp.
"Parameter values for the HDTV standards for production and international programme exchange," Recommendation ITU-R BT.709-5, International Telecommunication Union, Apr. 2002, 32 pp.
"Parameter values for ultra-high definition television systems for production and international programme exchange," Recommendation ITU-R BT.2020-2, International Telecommunication Union, Oct. 2015, 8 pp.
Yu et al., "Requirements for an extension of HEVC for coding of screen content," ISO/IEC JTC 1/SC 29/WG 11 Requirements subgroup, San Jose, California, USA, document MPEG2013/N14174, Jan. 2014, 5 pp.
"Studio encoding parameters of digital television for standard 4:3 and wide-screen 16:9 aspect ratios," Recommendation ITU-R BT.601-7, Mar. 2011, 20 pp.
International Search Report and Written Opinion from International Application No. PCT/US2015/054488, dated Jan. 15, 2016, 15 pp.
Response to Written Opinion dated Jan. 15, 2016, from International Application No. PCT/US2015/054488, filed on Jul. 22, 2016, 4 pp.
Second Written Opinion from International Application No. PCT/US2015/054488, dated Sep. 28, 2016, 8 pp.
Response to Second Written Opinion dated Sep. 28, 2016, from International Application No. PCT/US2015/054488, filed on Nov. 14, 2016, 4 pp.

* cited by examiner

4:2:0 sample format

4:2:2 sample format

4:4:4 sample format

QP DERIVATION AND OFFSET FOR ADAPTIVE COLOR TRANSFORM IN VIDEO CODING

This application claims the benefit of

U.S. Provisional Patent Application 62/061,099 filed 7 Oct. 2014, and

U.S. Provisional Patent Application 62/064,347 filed 15 Oct. 2014, the entire content of which are incorporated herein in their entirety.

TECHNICAL FIELD

This disclosure relates to video coding, such as video encoding or video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to determining quantization parameters when color-space conversion coding is used and, furthermore, this disclosure describes techniques for generating and parsing various syntax elements, in an encoded bitstream of video data, used for signaling quantization parameters when color-space conversion coding is used.

In one example, a method of decoding video data includes determining for one or more blocks of the video data that adaptive color transform is enabled; determining a quantization parameter for the one or more blocks; in response to a value of the quantization parameter being below a threshold, modifying the quantization parameter to determine a modified quantization parameter; and dequantizing transform coefficients based on the modified quantization parameter.

In another example, a device for decoding video data includes a video data memory and one or more processors configured to determine for one or more blocks of the video data that adaptive color transform is enabled; determine a quantization parameter for the one or more blocks; modify the quantization parameter to determine a modified quantization parameter in response to a value of the quantization parameter being below a threshold; and dequantize transform coefficients based on the modified quantization parameter.

In another example, an apparatus for decoding video data includes means for determining for one or more blocks of the video data that adaptive color transform is enabled; means for determining a quantization parameter for the one or more blocks; means for modifying the quantization parameter to determine a modified quantization parameter in response to a value of the quantization parameter being below a threshold; and means for dequantizing transform coefficients based on the modified quantization parameter.

In another example, a computer-readable storage medium storing instructions that when executed by one or more processors cause the one or more processors to: determine for one or more blocks of the video data that adaptive color transform is enabled; determine a quantization parameter for the one or more blocks; modify the quantization parameter to determine a modified quantization parameter in response to a value of the quantization parameter being below a threshold; and dequantize transform coefficients based on the modified quantization parameter.

The details of one or more examples of the disclosure are set forth in the accompanying drawings and the description below. Other features, objects, and advantages of the disclosure will be apparent from the description, drawings, and claims.

DETAILED DESCRIPTION

This disclosure describes techniques related to adaptive color transform quantization parameter derivations. This disclosure identifies various issues related to how quantization parameter derivation when adaptive color transform is used and proposes solutions to address these issues. This disclosure describes video coding techniques, including techniques related to emerging screen content coding (SCC) extensions and range extensions (RExt) of the recently finalized high efficiency video coding (HEVC) standard. The SCC and range extensions are being designed to potentially support high bit depth (e.g. more than 8 bit) and/or different chroma sampling formats such as 4:4:4, 4:2:2, 4:2:0, 4:0:0, etc, and are therefore being designed to include new coding tools not included in the base HEVC standard.

One such coding tool is color-space conversion coding. In color-space conversion coding, a video encoder may convert residual data from a first color space (e.g. YCbCr) to a second color space (e.g. RGB) in order to achieve better coding quality (e.g. a better rate-distortion tradeoff). Regardless of the color space of the residual data, a video encoder typically transforms the residual data into transform coefficients and quantizes the transform coefficients. A video decoder performs the reciprocal processes of dequantizing the transform coefficients and inverse transforming the transform coefficients to reconstruct the residual data. The video encoder generates, for inclusion in the encoded bitstream of video data, a quantization parameter indicating an amount of scaling used in quantizing the transform coefficient levels. The video decoder parses the bitstream to determine the quantization parameter used by the video encoder. The quantization parameter may also be used by other video coding processes, such as deblock filtering.

This disclosure describes techniques related to determining quantization parameters when color-space conversion coding is used and, furthermore, this disclosure describes techniques for signaling, from an encoder to a decoder as part of an encoded bitstream of video data, quantization parameters when color-space conversion coding is used.

Figure 1:
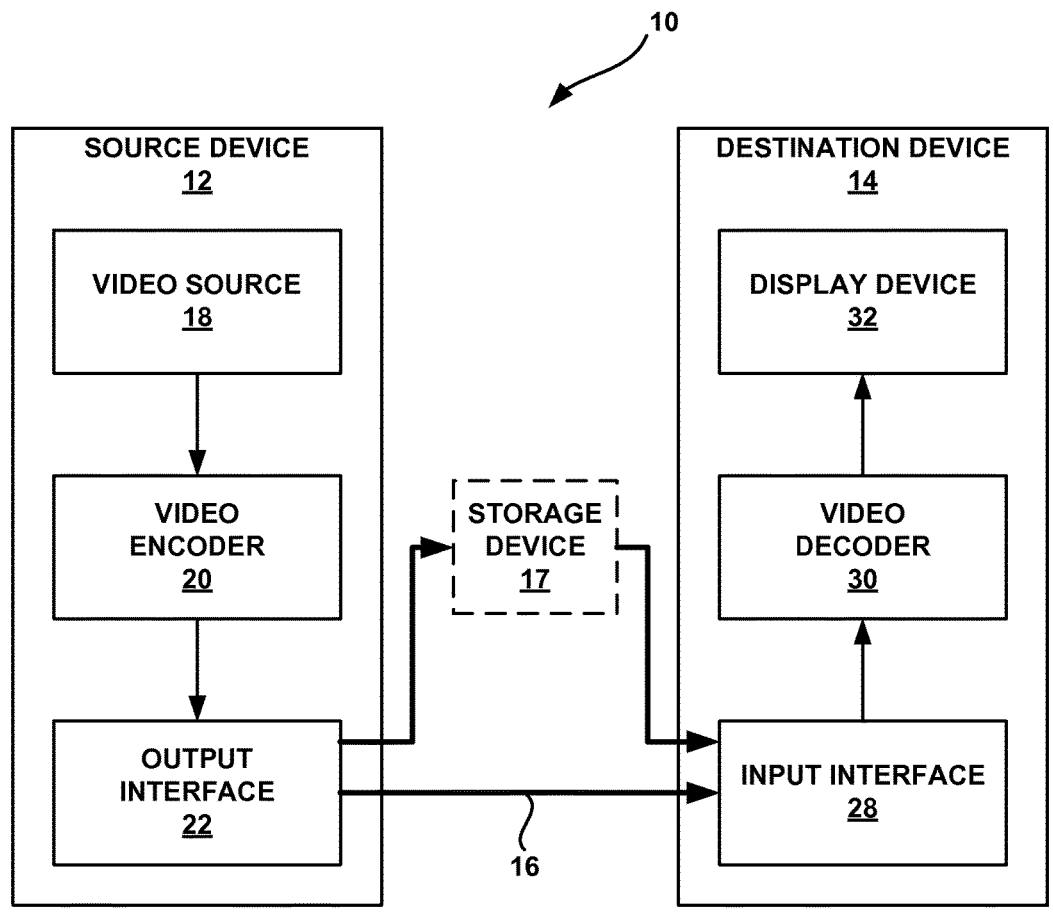
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure, including techniques for coding blocks in an IBC mode and techniques for parallel processing. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 17. Similarly, encoded data may be accessed from storage device 17 by input interface. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 17 may correspond to a file server or another intermediate storage device that may hold the encoded video generated by source device 12. Destination device 14 may access stored video data from storage device 17 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., modulated according to a wireless standard such, including a wireless local area network standard such as Wi-Fi or a wireless telecommunication standard such as LTE or another cellular communication standard), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 17 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 17, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as HEVC, and may conform to the HEVC Test Model (HM). A working draft of the HEVC standard, referred to as "HEVC Working Draft 10" or "HEVC WD10," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013. Another HEVC draft specification is available from http://phenix.int-evry.fr/jct/doc_end_user/documents/15_Geneva/wg11/JCTVC-O1003-v2.zip. The techniques described in this disclosure may also operate according to extensions of the HEVC standard that are currently in development.

Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

The design of the HEVC has been recently finalized by the JCT-VC of ITU-T Video Coding Experts Group (VCEG) and ISO/IEC Motion Picture Experts Group (MPEG). The Range Extensions to HEVC, referred to as HEVC RExt, are also being developed by the JCT-VC. A recent Working Draft (WD) of Range extensions, referred to as RExt WD7 hereinafter, is available from http://phenix.int-evey.fr/jct/doc_end_user/documents/17_Valencia/wg11/JCTVC-Q1005-v4.zip.

This disclosure will generally refer to the recently finalized HEVC specification text as HEVC version 1 or base HEVC. The range extension specification may become the version 2 of the HEVC. With respect to many coding tools, such as motion vector prediction, HEVC version 1 and the range extension specification are technically similar. Therefore whenever this disclosure describes changes relative to HEVC version 1, the same changes may also apply to the range extension specification, which generally includes the base HEVC specification, plus some additional coding tools. Furthermore, it can generally be assumed that HEVC version 1 modules may also be incorporated into a decoder implementing the HEVC range extension.

New coding tools for screen-content material such as text and graphics with motion are currently in development and being contemplated for inclusion in future video coding standards, including future version of HEVC. These new coding tools potentially improve coding efficiency for screen content. As there is evidence that significant improvements in coding efficiency may be obtained by exploiting the characteristics of screen content with novel dedicated coding tools, a Call for Proposals (CfP) has been issued with the target of possibly developing future extensions of the HEVC standard including specific tools for SCC). Companies and organizations have been invited to submit proposals in response to this Call. The use cases and requirements of this CfP are described in MPEG document N14174. During the 17$^{th}$ JCT-VC meeting, SCC test model (SCM) is established. A recent SCC working draft (WD) is JCTVC-U1005 and is available at http://phenix.int-evry._fr/j ct/doc_end user/documents/21_Warsaw/wg11/JCTV_C-U1005-v1. zip.

This disclosure contemplates that video encoder 20 of source device 12 may be configured to encode video data according to any of these current or future standards. Similarly, this disclosure also contemplates that video decoder 30 of destination device 14 may be configured to decode video data according to any of these current or future standards.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

In order to generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

A video sampling format, which may also be referred to as a chroma format, may define the number of chroma samples included in a CU with respect to the number of luma samples included in a CU. Depending on the video sampling format for the chroma components, the size, in terms of number of samples, of the U and V components may be the same as or different from the size of the Y component. In the HEVC standard, a value called chroma_format_idc is defined to indicate different sampling formats of the chroma components, relative to the luma component. In HEVC, chroma_format_idc is signaled in the SPS. Table 1 illustrates the relationship between values of chroma_format_idc and associated chroma formats.

TABLE 1 different chroma formats defined in HEVC

| chroma_format_idc | chroma format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component. In the chroma formats described in Table 1, the two chroma components have the same sampling rate. Thus, in 4:2:0 sampling, each of the two chroma arrays has half the height and half the width of the luma array, while in 4:2:2 sampling, each of the two chroma arrays has the same height and half the width of the luma array. In 4:4:4 sampling, each of the two chroma arrays, may have the same height and width as the luma array, or in some instances, the three color planes may all be separately processed as monochrome sampled pictures.

In the example of Table 1, for the 4:2:0 format, the sampling rate for the luma component is twice that of the chroma components for both the horizontal and vertical directions. As a result, for a coding unit formatted according to the 4:2:0 format, the width and height of an array of samples for the luma component are twice that of each array of samples for the chroma components. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component. For a coding unit formatted according to the 4:4:4 format, an array of samples for the luma component has the same width and height as an array of samples for each chroma component. It should be noted that in addition to the YUV color space, video data can be defined according to an RGB space color. In this manner, the chroma formats described herein may apply to either the YUV or RGB color space. RGB chroma formats are typically sampled such that the number of red samples, the number of green samples and the number of blue samples are equal. Thus, the term "4:4:4 chroma format" as used herein may refer to either a YUV color space or an RGB color space wherein the number of samples is equal for all color components.

Figure 2A:
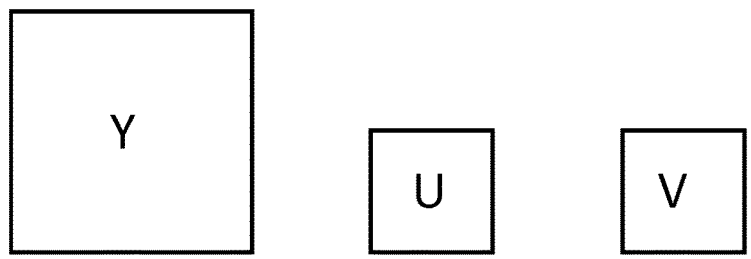
FIGS. 2A-2C are conceptual diagrams illustrating different sample formats for video data.
Figure 2B:
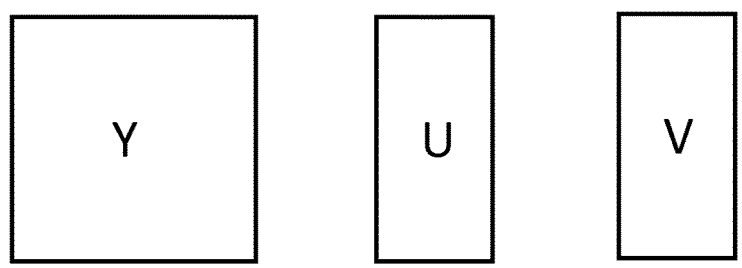
Figure 2C:
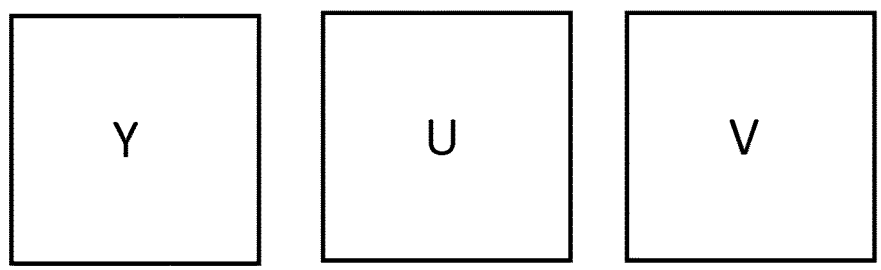

FIGS. 2A-2C are conceptual diagrams illustrating different sample formats for video data. FIG. 2A is a conceptual diagram illustrating the 4:2:0 sample format. As illustrated in FIG. 2A, for the 4:2:0 sample format, the chroma components are one quarter of the size of the luma component. Thus, for a CU formatted according to the 4:2:0 sample format, there are four luma samples for every sample of a chroma component. FIG. 2B is a conceptual diagram illustrating the 4:2:2 sample format. As illustrated in FIG. 2B, for the 4:2:2 sample format, the chroma components are one half of the size of the luma component. Thus, for a CU formatted according to the 4:2:2 sample format, there are two luma samples for every sample of a chroma component. FIG. 2C is a conceptual diagram illustrating the 4:4:4 sample format. As illustrated in FIG. 2C, for the 4:4:4 sample format, the chroma components are the same size of the luma component. Thus, for a CU formatted according to the 4:4:4 sample format, there is one luma sample for every sample of a chroma component.

Figure 3:
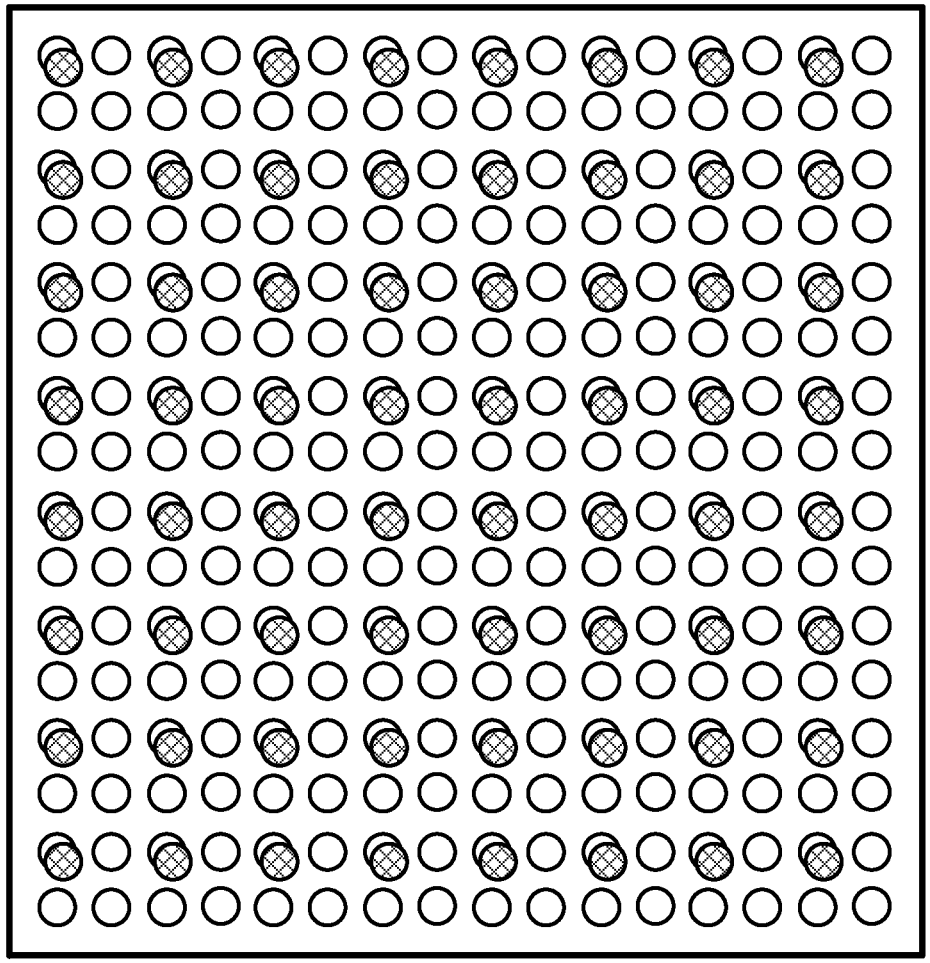
FIG. 3 is a conceptual diagram illustrating a 16×16 coding unit formatted according to a 4:2:0 sample format.

FIG. 3 is a conceptual diagram illustrating an example of a 16×16 coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, as described above, a CU may be partitioned into smaller CUs. For example, the CU illustrated in FIG. 3 may be partitioned into four 8×8 CUs, where each 8×8 CU includes 8×8 samples for the luma component and 4×4 samples for each chroma component.

Figure 4:
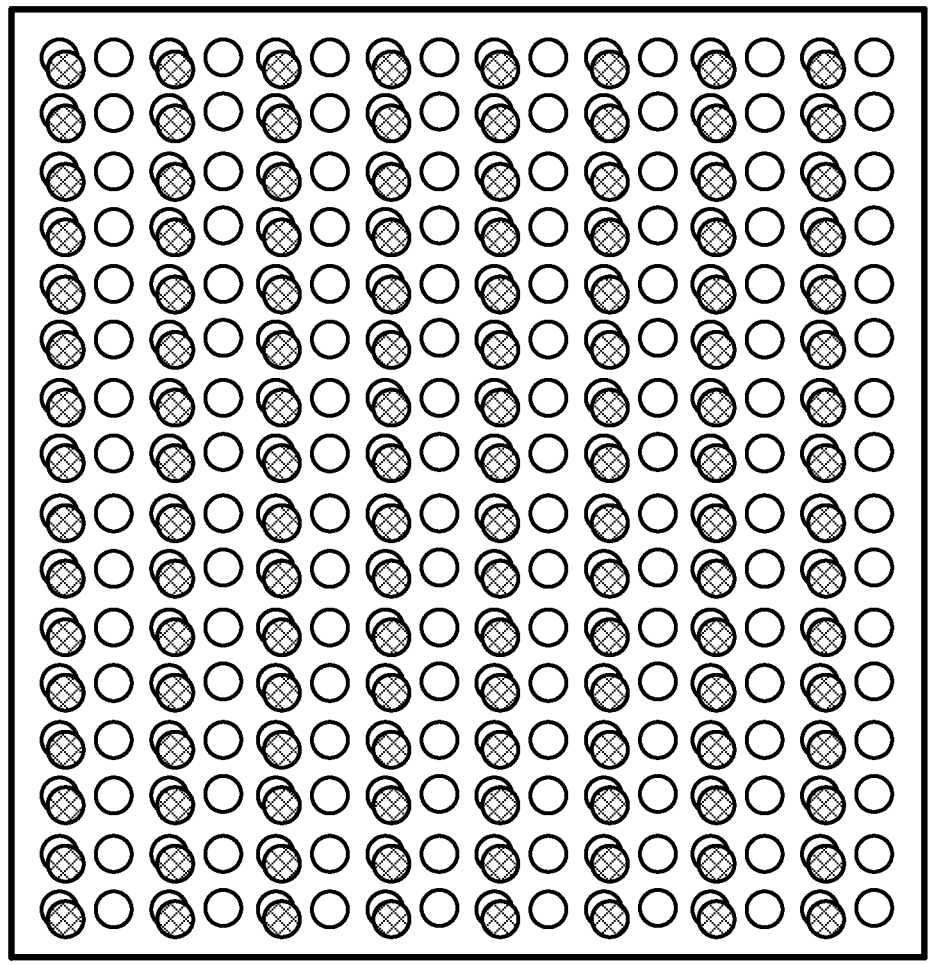
FIG. 4 is a conceptual diagram illustrating a 16×16 coding unit formatted according to a 4:2:2 sample format.

FIG. 4 is a conceptual diagram illustrating an example of a 16×16 coding unit formatted according to a 4:2:2 sample format. FIG.4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:2 sample format includes 16×16 samples of luma components and 8×16 samples for each chroma component. Further, as described above, a CU may be partitioned into smaller CUs. For example, the CU illustrated in FIG. 4 may be partitioned into four 8×8 CUs, where each CU includes 8×8 samples for the luma component and 4×8 samples for each chroma component.

In accordance with the techniques described in this disclosure, an in-loop color-space transform for residual signals (i.e., residual blocks) is proposed for sequences in 4:4:4 chroma format; however, the techniques are not limited to the 4:4:4 format. The in-loop color-space transform process transforms prediction error signals (i.e., residual signals) in RGB/YUV chroma format into those in a sub-optimal color-space. The in-loop color-space transform can further reduce the correlation among the color components. The transform matrix may be derived from pixel sample values for each CU by a singular-value-decomposition (SVD). The color-space transform may be applied to prediction error of both intra mode and inter mode.

When the color-space transform is applied to inter mode, the residual is firstly converted to a different domain with the derived transform matrix. After the color-space conversion, the coding steps, such as DCT/DST, quantization, and entropy coding are performed, in order.

When the color-space transform is applied to a CU coded using an intra mode, the prediction and current block are firstly converted to a different domain with the derived transform matrix, respectively. After the color-space conversion, the residual between current block and a predictor for the current block is further transformed with DCT/DST, quantized, and entropy coded.

A video encoding device, such as video encoder 20, performs a forward operation, where a color-space transform matrix comprising conversion values a, b, c, d, e, f, g, h, and i is applied to three planes G, B, and R to derive values for color components P, Q, and S as follows:

$$\begin{bmatrix} a & b & c \\ d & e & f \\ g & h & i \end{bmatrix} \begin{bmatrix} G \\ B \\ R \end{bmatrix} = \begin{bmatrix} P \\ Q \\ S \end{bmatrix}$$

Resulting values may be clipped within the range of the HEVC specification, since values may be enlarged up to $\sqrt{3}$ times in the worst case. A video decoding device, such as video decoder 30, performs an inverse operation, where a color-space transform matrix comprising conversion values $a^t$, $b^t$, $c^t$, $d^t$, $e^t$, $f^t$, $g^t$, $h^t$, and $i^t$ is applied to the three color components P', Q', and R' to derive the three planes G', B' and R' as follows, $$\begin{bmatrix} a & b & c \\ d & e & f \\ g & h & i \end{bmatrix}^t \begin{bmatrix} P' \\ Q' \\ S' \end{bmatrix} = \begin{bmatrix} G' \\ B' \\ R' \end{bmatrix}$$

Figure 5:
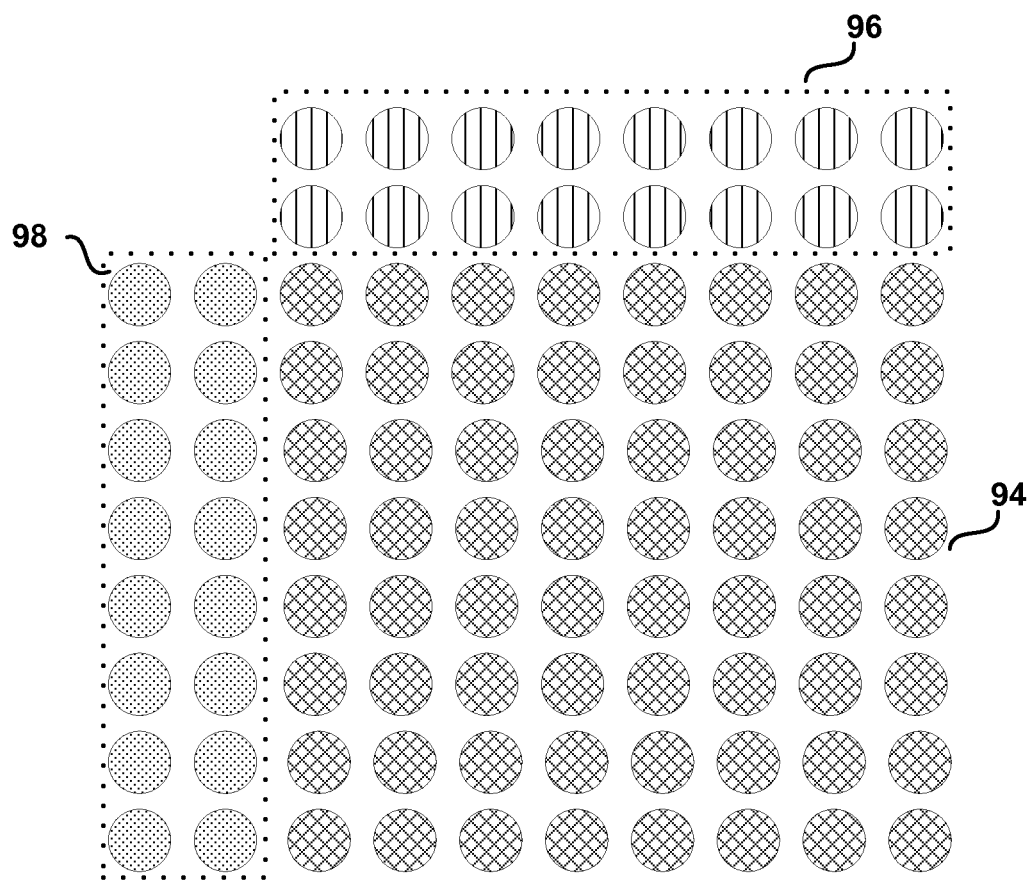
FIG. 5 is a conceptual diagram illustrating an example of a target block and reference sample for an intra 8×8 block, according to one or more techniques of the current disclosure.

FIG. 5 is a conceptual diagram illustrating an example of a target block and reference sample for an intra 8×8 block, according to one or more techniques of the current disclosure. A transform matrix may be derived using singular-value-decomposition (SVD) from the reference sample values. A video coding device (e.g., video encoder 20 or video decoder 30) may use different reference samples for the intra case and inter case. For the case of an intra coded block, the target blocks and reference samples may be as shown in FIG. 5. In FIG. 5, the target block consists of 8×8 crosshatched samples 94, and above reference samples 96 are shown as striped, and left references samples 98 are shown as dotted.

For the case of an inter coded block, reference samples for the matrix derivation may be the same as the reference samples for motion compensation. Reference samples in the advanced motion prediction (AMP) block may be sub-sampled such that the number of reference samples is reduced. For example, the number of reference samples in a 12×16 block is reduced by ⅔.

In some of the above examples, the color-space transform process may be always applied. Therefore, there may be no need to signal whether the color-space transform process is invoked or not. In addition, both video encoder 20 and video decoder 30 may use the same method to derive the transform matrix in order to avoid the overhead for signaling the transform matrix.

Video encoder 20 and video decoder 30 may use various color-space transform matrices. For example, video encoder 20 and video decoder 30 may apply different color-space transform matrices for different color spaces. For instance, video encoder 20 and video decoder 30 may use a pair of YCbCr transform matrixes to convert sample values from the RGB color space to the YCbCr color space and back. The following equations show one example set of YCbCr transform matrixes:

Forward: $\begin{bmatrix} Y \\ Cb \\ Cr \end{bmatrix} = \begin{bmatrix} 0.2126 & 0.7152 & 0.0722 \\ -0.1172 & -0.3942 & 0.5114 \\ 0.5114 & -0.4645 & -0.0469 \end{bmatrix} \begin{bmatrix} R \\ G \\ B \end{bmatrix}$ Inverse: $\begin{bmatrix} R \\ G \\ B \end{bmatrix} = \begin{bmatrix} 1 & 0 & 1.5397 \\ 1 & -0.1831 & -0.4577 \\ 1 & 1.8142 & 0 \end{bmatrix} \begin{bmatrix} Y \\ Cb \\ Cr \end{bmatrix}$ In another example, video encoder 20 and video decoder 30 may use a pair of YCoCg transform matrixes to convert sample values from the RGB color space to the YCoCg color space and back. The following equations show one example set of YCoCg transform matrixes:

Forward: $\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}$ Inverse: $\begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$ Another such matrix may be the YCoCg-R matrix, which is a revisable version of the YCoCg matrix that scales the Co and Cg components by a factor of two. By using a lifting technique, video encoder 20 and video decoder 30 may achieve the forward and inverse transform by the following equations:

$Co = R - B$ $t = B + [Co/2]$ $Cg = G - t$ $Y = t + [Cg/2]$ Forward:

$t = Y - [Cg/2]$ $G = Cg + t$ $B = t - [Co/2]$ $R = B + Co$ Inverse:

In the above equations and matrices, the forward transformations may be performed before the encoding process (e.g., by a video encoder). Conversely, the inverse transformations may be performed after the decoding process (e.g., by a video decoder). It should also be noted that video encoder 20 includes a decoding loop to reconstruct the encoded date for use in predicting other video data. Accordingly, like video decoder 30, the decoding loop of video encoder 20 may also perform the inverse transformations.

The techniques of this disclosure potentially address one or more problems and more specifically, potential problems with the QP derivation when cu_residual_act_flag is enabled. For example, according to existing solutions, when adaptive color transform is enabled, during the scaling and transformation process, a QP offset of −5 is added for luma and Cb chroma component, and −3 is added for Cr chroma component. The resultant value of Qp, however, may underflow the allowed Qp range. For example, in the current test model it is possible that the resultant Qp may underflow to −5 when the range allowed by HEVC is between 0 and 51.

This disclosure also describes techniques for signalling adaptive QP offsets when adaptive color transform is enabled.

A portion of the scaling and transformation process is set forth below.

8.6.2 Scaling and Transformation Process

The quantization parameter qP is derived as follows in the current test model, If cIdx is equal to 0, $qP = Qp'_Y + (cu\_residual\_act\_flag[xTbY][yTbY]?-5:0)$  (8-261)

Otherwise, if cIdx is equal to 1, $qP = Qp'_{Cb} + (cu\_residual\_act\_flag[xTbY][yTbY]?-5:0)$  (8-262)

Otherwise (cIdx is equal to 2), $qP = Qp'_{Cr} + (cu\_residual\_act\_flag[xTbY][yTbY]?-3:0)$  (8-263)

where cIdx specifies the colour component of the current block and cu_residual_act flag specifies whether adaptive colour transform is applied to the residual samples of the current coding unit.

This disclosure describes various techniques that may address the problems introduced above. Each of the following techniques may be implemented separately or jointly with one or more of the others. According to one technique of this disclosure, video decoder 30 may clip the resultant Qp's from section 8.6.2 equation 8-261, 8-262, 8-263—scaling and transformation process (after offset is added when adaptive color transform is enabled) to HEVC Qp range that is 0, 51+QpBdOffset$_Y$. According to another technique of this disclosure, video encoder 20 may signal to video decoder 30 the Qp offset to be applied in section 8.6.2 (scaling and transformation process) when adaptive color transform is enabled. This signaling of Qp offset may be done at various granularity levels like VPS, SPS, PPS, slice header or its extension. The Qp offset may be signalled for all the components (luma+chroma) or only some of the components (e.g. chroma)

According to another technique of this disclosure, video encoder 20 may signal to video decoder 30 a flag indicating whether or not QP offset is to be applied in section 8.6.2 (scaling and transformation process) when adaptive color transform is enabled. This signaling of a flag can be done at various granularity levels like VPS, SPS, PPS, slice header or its extension. The signaling of flag can be signalled for all the components (luma+chroma) or only some of the components (e.g. chroma).

Example implementations of the techniques intoduce above will now be described in more detail. According to one technique of this disclosure, video encoder 20 and video decoder 30 can be configured to clip the Qp's to within the HEVC Qp's range. In order to keep the allowed Qp range as same that is used in HEVC when adaptive color transform is used, this disclosure describes techniques for clipping the range of the Qp values to that of HEVC Qp range. The proposed changes to the test model are italicized below.

8.6.2 Scaling and Transformation Process

If cIdx is equal to 0, $qP = Clip3(0, 51+QpBdOffset_Y, Qp'Y + (cu\_residual\_act\_flag[xTbY][yTbY]?-5:0))$ When ChromaArrayType is not equal to 0, if cIdx is equal to 1, $qP = Clip3(0, 51+QpBdOffset_C, Qp'_{Cb} + (cu\_residual\_act\_flag[xTbY][yTbY]?-5:0))$  (8-262)

Otherwise (cIdx is equal to 2), $qP = Clip3(0, 51+QpBdOffset_C, Qp'_{Cr} + (cu\_residual\_act\_flag[xTbY][yTbY]?-3:0))$  (8-262)

Flexible Signalling of QP Offset for Adaptive Color Transform

| pps_scc_extension ( ) { | Descriptor |
|---|---|
| ... | |
| if(residual_adaptive_colour_transform_enabled_flag){ | |
|   pps_slice_act_qp_offsets_present_flag | |
|   pps_act_y_qp_offset | se(v) |
|   pps_act_cb_qp_offset | |
|   pps_act_cr_qp_offset | |
| } | |
| ... | |
| } | |

| slice_segment_header( ) { | Descriptor |
|---|---|
|   first_slice_segment_in_pic_flag | u(1) |
|   ............ | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|   } | |
|   if( chroma_qp_offset_list_enabled_flag ) | |
|     cu_chroma_qp_offset_enabled_flag | u(1) |
|   if(pps_slice_act_qp_offsets_present_flag){ | |
|     slice_act_y_qp_offset | u(1) |
|     slice_act_cb_qp_offset | |
|     slice_act_cr_qp_offset | |
|   } | |
| ...... | |

It is proposed to clip the range of the QP values for luma and chroma component.
If cIdx is equal to 0, $qP = \text{Clip3}(0, 51+\text{QpBdOffset}_Y, Qp'Y + (cu\_residual\_act\_flag[xTbY][yTbY] ? pps\_act\_y\_qp\_offset + slice\_act\_y\_qp\_offset:0))$ When ChromaArrayType is not equal to 0,
if cIdx is equal to 1, $qP = \text{Clip3}(0, 51+\text{QpBdOffset}_C, Qp'_{Cb} + (cu\_residual\_act\_flag[xTbY][yTbY] ? pps\_act\_pps\_cb\_qp\_offset + slice\_act\_cb\_qp\_offset:0))$   (8-262)

Otherwise (cIdx is equal to 2), $qP = \text{Clip3}(0, 51+\text{QpBdOffset}_C + (cu\_residual\_act\_flag[xTbY][yTbY] ? pps\_act\_pps\_cr\_qp\_offset + slice\_act\_cr\_qp\_offset:0)$   (8-263)

pps_act_y_qp_offset, pps_act_cb_qp_offset and pps_act_cr_qp_offset specify offsets to the luma, cb and cr quantization parameter qP derived in section 8.6.2, respectively. The values of pps_act_y_qp_offset, pps_cb_qp_offset and pps_cr_qp_offset shall be in the range of −12 to +12, inclusive. When ChromaArrayType is equal to 0, pps_act_cb_qp_offset and pps_act_cr_qp_offset are not used in the decoding process and decoders shall ignore their value.

pps_slice_act_qp_offsets_present_flag equal to 1 specifies that slice_act_y_qp_offset, slice_act_cb_qp_offset, slice_act_cr_qp_offset are present in the slice header. pps_slice_act_qp_offsets_present_flag equal to 0 specifies that slice_act_y_qp_offset, slice_act_cb_qp_offset, slice_act_cr_qp_offset are not present in the slice header. When not present, the value of cu_chroma_qp_offset_enabled_flag is inferred to be equal to 0.

slice_act_y_qp_offset, slice_cb_qp_offset and slice_cr_qp_offset specify offsets to the luma, cb and cr quantization parameter qP derived in section 8.6.2, respectively. The values of slice_act_y_qp_offset, slice_cb_qp_offset and slice_cr_qp_offset shall be in the range of −12 to +12, inclusive. When ChromaArrayType is equal to 0, slice_act_cb_qp_offset and slice_act_cr_qp_offset are not used in the decoding process and decoders shall ignore their value.

Techniques for signalling the presence of QP offset for adaptive color transform will now be described. As discussed in technique (1) above, fixed negative QP offset when adaptive color transform is enabled narrows the Qp range at the higher Qp's. For example, with the current definition when adaptive color transform is enabled it is impossible to reach QP's over 46+QpBdOffset$_Y$, which in some scenarios are necessary to meet target bitrate. In the below solution, it is proposed to signal a flag to indicate whether Qp offset shall be added or not. The proposed changes to the test model are highlighted in yellow text.

| slice_segment_header( ) { | Descriptor |
|---|---|
|   first_slice_segment_in_pic_flag | u(1) |
|   ............ | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|   } | |
|   if( chroma_qp_offset_list_enabled_flag ) | |
|     cu_chroma_qp_offset_enabled_flag | u(1) |
|   if( residual_adaptive_colour_transform_enabled_flag) | |
|     slice_act_qp_offset_present_flag | u(1) |
|   ...... | | slice_act_qp_offset_present_flag equal to 1 specifies that a Qp offset is applied for the coding units with cu_residual_act_flag equal to 1. slice_act_qp_offset_present_flag equal to 0 specifies that a Qp offset is not applied for the coding units with cu_residual_act_flag equal to 1. When not present, the value of cu_chroma_qp_offset_enabled_flag is inferred to be equal to 0.

If cIdx is equal to 0, $qP = \text{Clip3}(0, 51+\text{QpBdOffset}_Y, Qp'Y + (cu\_residual\_act\_flag[xTbY][yTbY] \,\&\&\, slice\_act\_qp\_offset\_present\_flag?-5:0))$ When ChromaArrayType is not equal to 0,
if cIdx is equal to 1, $qP = \text{Clip3}(0, 51+\text{QpBdOffset}_C, Qp'_{Cb} + (cu\_residual\_act\_flag[xTbY][yTbY] \,\&\&\, slice\_act\_qp\_offset\_present\_flag?-5:0))$   (8-262)

Otherwise (cIdx is equal to 2), $qP = \text{Clip3}(0, 51+\text{QpBdOffset}_C Qp'_{Cr} + (cu\_residual\_act\_flag[xTbY][yTbY] \,\&\&\, slice\_act\_qp\_offset\_present\_flag?-3:0)$   (8-263)

Another example implementation of QP offset for adaptive color transform will now be described. This disclosure proposes the following:

a) Signal the adaptive color transform enabled flag in the picture parameter set instead of sequence parameter set. This potentially benefits from being able to adapt at picture level the usage of adaptive color transform.

b) A bitstream restriction is proposed to disable adaptive color transform when chroma format is not 4:4:4. In one example, this restriction is proposed to be applied on the adaptive color transform enable flag (residual_adaptive_colour_transform_enabled_flag) Below an example syntax and semantics are detailed.

| pps_scc_extension ( ) { | Descriptor |
|---|---|
| ... | |
| residual_adaptive_colour_transform_enabled_flag | u( 1 ) |
| if(residual_adaptive_colour_transform_enabled_flag){ | |
|   pps_slice_act_qp_offsets_present_flag | |
|   pps_ act _y_qp_offset | se(v) |
|   pps_ act _cb_qp_offset | |
|   pps_ act _cr_qp_offset | |
| } | |
| ... | |
| } | |

| slice_segment_header( ) { | Descriptor |
|---|---|
| first_slice_segment_in_pic_flag | u(1) |
| ............... | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|   } | |
|   if( chroma_qp_offset_list_enabled_flag ) | |
|     cu_chroma_qp_offset_enabled_flag | u( 1 ) |
| if(pps_slice_act_qp_offsets_present_flag){ | |
|   slice_ act _y_qp_offset | se(v) |
|   slice_ act _cb_qp_offset | se(v) |
|   slice_ act _cr_qp_offset | se(v) |
| } | |
| ...... | | residual_adaptive_colour_transform_enabled_flag equal to 1 specifies that an adaptive colour transform may be applied to the residual in the decoding process for the pictures referring to the PPS. residual_adaptive_colour_transform_enabled_flag equal to 0 specifies that adaptive colour transform is not applied to the residual for the pictures referring to the PPS. When not present, the value of residual_adaptive_colour_transform_enabled_flag is inferred to be equal to 0.

When chroma_format_idc is not equal to 3, residual_adaptive_colour_transform_enabled_flag shall be equal to 0.

pps_act _y_qp_offset, pps_act_cb_qp_offset and pps_act_cr_qp_offset specify offsets to the luma, cb and cr quantization parameter qP derived in section 8.6.2, respectively. The values of pps_act_y_qp_offset, pps_cb_qp_offset and pps_cr_qp_offset shall be in the range of −12 to +12, inclusive. When ChromaArrayType is equal to 0, pps_act_cb_qp_offset and pps_act_cr_qp_offset are not used in the decoding process and decoders shall ignore their value.

pps_slice_act_qp_offsets_present_flag equal to 1 specifies that slice_act_y_qp_offset, slice_act cb_qp_offset, slice_act_cr_qp_offset are present in the slice header. pps_slice_act_qp_offsets_present_flag equal to 0 specifies that slice_act_y_qp_offset, slice_act_cb_qp_offset, slice_act_cr_qp_offset are not present in the slice header. When not present, the value of cu_chroma_qp_offset_enabled_flag is inferred to be equal to 0.

slice_act_y_qp_offset, slice_cb_qp_offset and slice_cr_qp_offset specify offsets to the luma, cb and cr quantization parameter qP derived in section 8.6.2, respectively. The values of slice_act_y_qp_offset, slice_cb_qp_offset and slice_cr_qp_offset shall be in the range of −12 to +12, inclusive. When ChromaArrayType is equal to 0, slice_act_cb_qp_offset and slice_act_cr_qp_offset are not used in the decoding process and decoders shall ignore their value.

Figure 6:
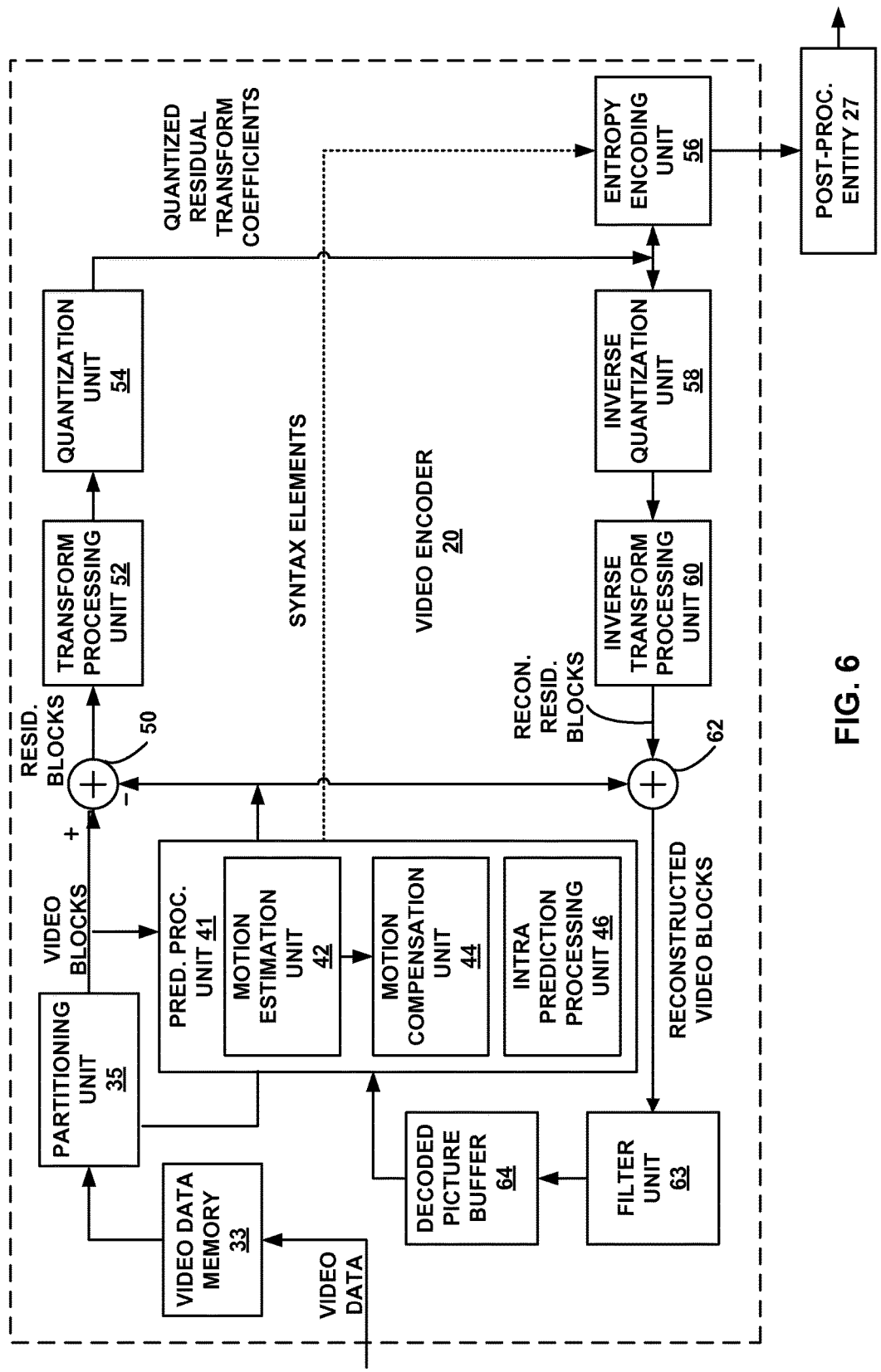
FIG. 6 is a block diagram illustrating an example video encoder that may implement the techniques described in this disclosure.

FIG. 6 is a block diagram illustrating an example video encoder 20 that may implement the techniques described in this disclosure. Video encoder 20 may be configured to output video to post-processing entity 27. Post-processing entity 27 is intended to represent an example of a video entity, such as a media aware network element (MANE) or a splicing/editing device, that may process encoded video data from video encoder 20. In some instances, post-processing entity 27 may be an example of a network entity, such as a MANE, but in other instances post-processing entity 27 may be considered part of encoder 20. For example, in some video encoding systems, post-processing entity 27 and video encoder 20 may be parts of separate devices, while in other instances, the functionality described with respect to post-processing entity 27 may be performed by the same device that comprises video encoder 20. In still other examples, post-processing entity 27 may be implemented as part of storage device 17 of FIG. 1.

Video encoder 20 may perform intra-, inter-, and IMC coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes. IMC coding modes, as described above, may remove spatial redundancy from a frame of video data, but unlike tradition intra modes, IMC coding codes may be used to locate predictive blocks in a larger search area within the frame and refer to the predictive blocks with offset vectors, rather than relying on intra-prediction coding modes.

In the example of FIG. 6, video encoder 20 includes video data memory 33, partitioning unit 35, prediction processing unit 41, filter unit 63, decoded picture buffer 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 6 as being an in loop filter, in other configurations, filter unit 63 may be implemented as a post loop filter.

Video data memory 33 may store video data to be encoded by the components of video encoder 20. The video data stored in video data memory 33 may be obtained, for example, from video source 18. Decoded picture buffer 64 may be a reference picture memory that stores reference video data for use in encoding video data by video encoder 20, e.g., in intra-, inter-, or IMC coding modes. Video data memory 33 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and decoded picture buffer 64 may be provided by the same memory device or separate memory devices. In various examples, video data memory 33 may be on-chip with other components of video encoder 20, or off-chip relative to those components.

As shown in FIG. 6, video encoder 20 receives video data and stores the video data in video data memory 33. Partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes, one of a plurality of inter coding modes, or one of a plurality of IMC coding modes, for the current video block based on error results (e.g., coding rate and the level of distortion). Prediction processing unit 41 may provide the resulting intra-, inter-, or IMC coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 may perform inter-predictive coding of the current video block relative to one or more predictive blocks in one or more reference pictures to provide temporal compression. Motion estimation unit 42 and motion compensation unit 44 within prediction processing unit 41 may also perform IMC coding of the current video block relative to one or more predictive blocks in the same picture to provide spatial compression.

Motion estimation unit 42 may be configured to determine the inter-prediction mode or IMC mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. In the case of IMC coding, a motion vector, which may be referred to as an offset vector in IMC, may indicate the displacement of a PU of a video block within a current video frame or picture relative to a predictive block within the current video frame.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

According to some techniques of this disclosure, when coding a video block using an IMC mode, motion estimation unit 42 may determine a motion vector, or offset vector, for a luma component of the video block, and determine an offset vector for a chroma component of the video block based on the offset vector for the luma component. In another example, when coding a video block using an IMC mode, motion estimation unit 42 may determine a motion vector, or offset vector, for a chroma component of the video block, and determine an offset vector for a luma component of the video block based on the offset vector for the chroma component. Thus, video encoder 20 may signal in the bitstream only one offset vector, from which offset vectors for both chroma and luma components of the video block may be determined.

Motion compensation, performed by motion compensation unit 44, may involve fetching or generating the predictive block based on the motion vector determined by motion estimation, possibly performing interpolations to sub-pixel precision. Interpolation filtering may generate additional pixel samples from known pixel samples, thus potentially increasing the number of candidate predictive blocks that may be used to code a video block. Upon receiving the motion vector for the PU of the current video block, motion compensation unit 44 may locate the predictive block to which the motion vector points in one of the reference picture lists, or in the case of the IMC coding, within the picture being coded. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction and IMC performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block (e.g., via inter-prediction, intra-prediction, or IMC) video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Interpolation filtering may generate additional pixel samples from known pixel samples, thus potentially increasing the number of candidate predictive blocks that may be used to code a video block. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

Figure 7:
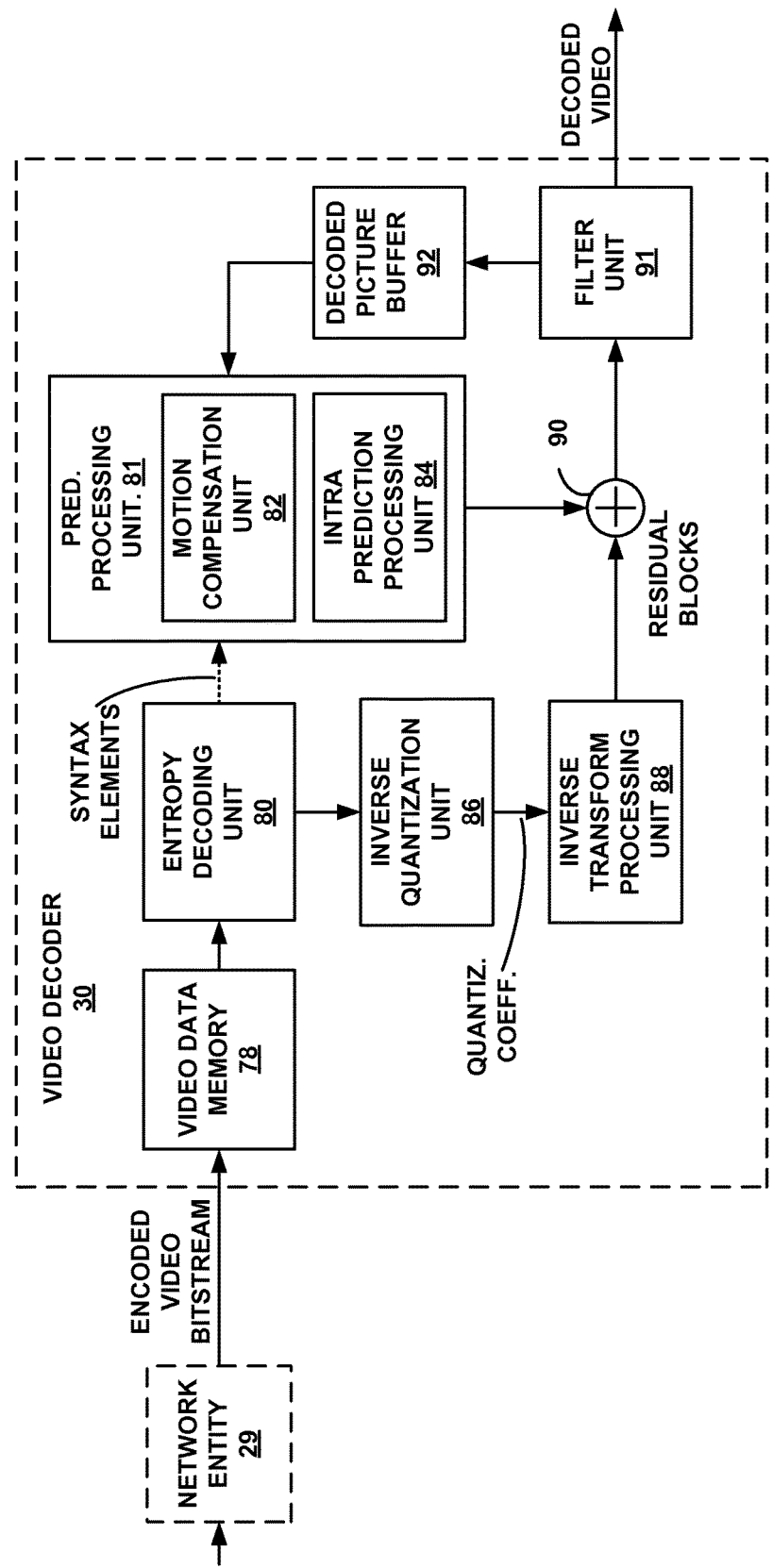
FIG. 7 is a block diagram illustrating an example video decoder that may implement the techniques described in this disclosure.

FIG. 7 is a block diagram illustrating an example video decoder 30 that may implement the techniques described in this disclosure. In the example of FIG. 7, video decoder 30 includes a video data memory 78, entropy decoding unit 80, prediction processing unit 81, inverse quantization unit 86, inverse transform processing unit 88, summer 90, filter unit 91, and decoded picture buffer 92. Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 6.

During the decoding process, video decoder 30 receives video data, e.g. an encoded video bitstream that represents video blocks of an encoded video slice and associated syntax elements, from video encoder 20. Video decoder 30 may receive the video data from network entity 29 and store the video data in video data memory 78. Video data memory 78 may store video data, such as an encoded video bitstream, to be decoded by the components of video decoder 30. The video data stored in video data memory 78 may be obtained, for example, from storage device 17, e.g., from a local video source, such as a camera, via wired or wireless network communication of video data, or by accessing physical data storage media. Video data memory 78 may form a coded picture buffer that stores encoded video data from an encoded video bitstream. Thus, although shown separately in FIG. 7, video data memory 78 and decoded picture buffer 92 may be provided by the same memory device or separate memory devices. Video data memory 78 and decoded picture buffer 92 may be formed by any of a variety of memory devices, such as dynamic random access memory (DRAM), including synchronous DRAM (SDRAM), magnetoresistive RAM (MRAM), resistive RAM (RRAM), or other types of memory devices. In various examples, video data memory 78 may be on-chip with other components of video decoder 30, or off-chip relative to those components.

Network entity 29, for example, may comprise a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30. Network entity 29 may be an example of storage device 17 of FIG. 1 in some cases.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice or when a block is IMC coded, motion compensation unit 82 of prediction processing unit 81 produces predictive blocks for a video block of the current video slice based on the motion vectors and other syntax elements received from entropy decoding unit 80. For inter prediction, the predictive blocks may be produced from one of the reference pictures within one of the reference picture lists. Video decoder 30 may construct the reference frame lists, List 0 and List 1, using default construction techniques based on reference pictures stored in decoded picture buffer 92. For IMC coding, the predictive blocks may be produced from the same picture as the block being predicted.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

According to some techniques of this disclosure, when coding a video block using an IMC mode, motion compensation unit 82 may determine a motion vector, or offset vector, for a luma component of the video block, and determine a motion vector for a chroma component of the video block based on the motion vector for the luma component. In another example, when coding a video block using an IMC mode, motion compensation unit 82 may determine a motion vector, or offset vector, for a chroma component of the video block, and determine a motion vector for a luma component of the video block based on the motion vector for the chroma component. Thus, video decoder 30 may receive in the bitstream only one offset vector, from which offset vectors for both chroma and luma components of the video block may be determined.

When decoding a video block using IMC mode, motion compensation unit 82 may, for example, modify a motion vector, referred to as an offset vector for IMC mode, for a luma component to determine an offset vector for a chroma component. Motion compensation unit 82 may, for example, modify one or both of an x-component and y-component of the offset vector of the luma block based on a sampling format for the video block and based on a precision of a sub-pixel position to which the offset vector points. For example, if the video block is coded using the 4:2:2 sampling format, then motion compensation unit 82 may only modify the x-component, not the y-component, of the luma offset vector to determine the offset vector for the chroma component. As can be seen from FIG. 4, in the 4:2:2 sampling format, chroma blocks and luma blocks have the same number of samples in the vertical direction, thus making modification of the y-component potentially unneeded. Motion compensation unit 82 may only modify the luma offset vector, if when used for locating a chroma predictive block, the luma offset vector points to a position without a chroma sample (e.g., at a sub-pixel position in the chroma sample of the current picture that includes the current block). If the luma offset vector, when used to locate a chroma predictive block, points to a position where a chroma sample is present, then motion compensation unit 82 may not modify the luma offset vector.

In other examples, if the video block is coded using the 4:2:0 sampling format, then motion compensation unit 82 may modify either or both of the x-component and the y-component of the luma offset vector to determine the offset vector for the chroma component. As can be seen from FIG. 3, in the 4:2:0 sampling format, chroma blocks and luma blocks have a different number of samples in both the vertical direction and the horizontal direction. Motion compensation unit 82 may only modify the luma offset vector, if when used for locating a chroma predictive block, the luma offset vector points to a position without a chroma sample (e.g., at a sub-pixel position in the chroma sample of the current picture that includes the current block). If the luma offset vector, when used to locate a chroma predictive block, points to a position where a chroma sample is present, then motion compensation unit 82 may not modify the luma offset vector.

Motion compensation unit 82 may modify a luma offset vector to generate a modified motion vector, also referred to as a modified offset vector. Motion compensation unit 82 may modify a luma offset vector that, when used to locate a chroma predictive block, points to a sub-pixel position such that the modified offset vector, used for the chroma block, points to a lower resolution sub-pixel position or to an integer pixel position. As one example, a luma offset vector that points to a ⅛ pixel position may be modified to point to a ¼ pixel position, a luma offset vector that points to a ¼ pixel position may be modified to point to a ½ pixel position, etc. In other examples, motion compensation unit 82 may modify the luma offset vector such that the modified offset vector always points to an integer pixel position for locating the chroma reference block. Modifying the luma offset vector to point to a lower resolution sub-pixel position or to an integer pixel position may eliminate the need for some interpolation filtering and/or reduce the complexity of any needed interpolation filtering.

Referring to FIGS. 3 and 4 and assuming the top left sample is located at position (0, 0), a video block has luma samples at both odd and even x positions and both odd and even y positions. In a 4:4:4 sampling format, a video block also has chroma samples at both odd and even x positions and both odd and even y positions. Thus, for a 4:4:4 sampling format, motion compensation unit may use the same offset vector for locating both a luma predictive block and a chroma predictive block. For a 4:2:2 sampling format, as shown in FIG. 4, a video block has chroma samples at both odd and even y positions but only at even x positions. Thus, for the 4:2:2 sampling format, if a luma offset vector points to an odd x position, motion compensation unit 82 may modify the x-component of the luma offset vector to generate a modified offset vector that points to an even x position so that the modified offset vector can be used for locating the reference chroma block for the chroma block of the current block without needing interpolation. Motion compensation unit 82 may modify the x-component, for example, by either rounding up or rounding down to the nearest even x position, i.e. changing the x-component such that it points to either the nearest left x position or nearest right x position. If the luma offset vector already points to an even x position, then no modification may be necessary.

For a 4:2:0 sampling format, as shown in FIG. 3, a video block has chroma samples only at even y positions and only at even x positions. Thus, for the 4:2:0 sampling format, if a luma offset vector points to an odd x position or odd y position, motion compensation unit 82 may modify the x-component or y-component of the luma offset vector to generate a modified offset vector that points to an even x position so that the modified offset vector can be used for locating the reference chroma block for the chroma block of the current block without needing interpolation. Motion compensation unit 82 may modify the x-component, for example, by either rounding up or rounding down to the nearest even x position, i.e. changing the x-component such that it points to either the nearest left x position or nearest right x position. Motion compensation unit 82 may modify the y-component, for example, by either rounding up or rounding down to the nearest even y position, i.e. changing the y-component such that it points to either the nearest above y position or nearest below y position. If the luma offset vector already points to an even x position and an even y position, then no modification may be necessary.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 7 as being an in loop filter, in other configurations, filter unit 91 may be implemented as a post loop filter. The decoded video blocks in a given frame or picture are then stored in decoded picture buffer 92, which stores reference pictures used for subsequent motion compensation. Decoded picture buffer 92 may be part of a memory that also stores decoded video for later presentation on a display device, such as display device 32 of FIG. 1, or may be separate from such a memory.

Figure 8:
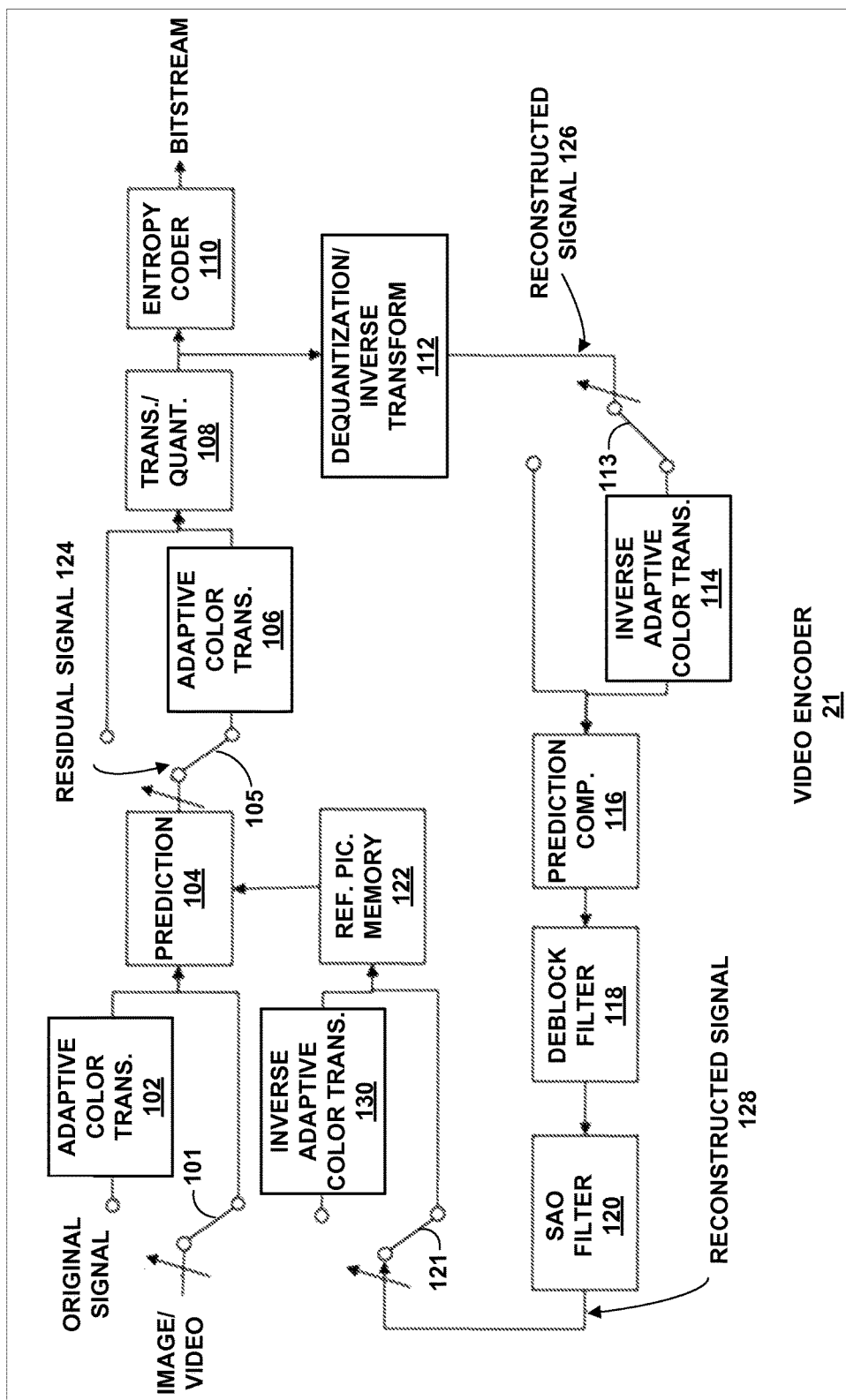
FIG. 8 is a block diagram illustrating another example of a video encoder that may utilize techniques for transforming video data having an RGB color space to video data having a second color space using a color transform in accordance with one or more aspects of this disclosure.

FIG. 8 is a block diagram illustrating another example video encoder 21 that may utilize techniques for transforming video data having an RGB color space to blocks of video data having a second color space using a color transform in accordance with one or more aspects of this disclosure.

FIG. 8 illustrates a more detailed version of video encoder 20. Video encoder 21 may be an example of video encoder 20 (FIG. 2) or video encoder 20 (FIG. 1). The example of FIG. 8 illustrates two possible examples for implementing the techniques of this disclosure. In the first implementation, video encoder 21 adaptively transforms a first block of an input video signal having a first color space to a second block having a second color space using a color transform of one or more color transform. The second illustrated example performs the same techniques, but performs the color transformation on blocks of residual video data, rather than on an input signal.

In the example of FIG. 8, video encoder 21 is shown as performing color transforms on predictive and residual blocks of video data based on the states of switches 101, 105, 113, 121. If switches 101, 105, 113, and 121 are switched the alternative position, video encoder 21 is configured to perform color transforms on blocks of video data of an original signal having an RGB color space to blocks of video data having a second color space before performing motion estimation, and motion prediction, rather than transforming blocks of predictive and/or residual video data.

One example process of performing color transforms on blocks of residual video data as illustrated in FIG. 8 is now described in greater detail. In the example of FIG. 8, an original signal 100 is passed to prediction processing unit 104 (following the path of switch 101). Prediction processing unit 104 may receive data from one or more reference pictures from reference picture memory 122. Prediction processing unit 104 generates a predictive block of video data, and combines the predictive block of video data from the original signal 100 to generate residual signal 124. In this example, adaptive color transformer 106 transforms the predictive block and the residual block of video data from an RGB color space to a second predictive block and a second residual block of video having a second color space. In some examples, video encoder 21 may select the second color space and the color transform based on a cost function.

Transform/quantization unit 108 may perform a transform (e.g., a discrete cosine transformation (DCT) or another type of transform) on the second video block having the second color space. In addition, transform/quantization unit 108 may quantize the second video block (i.e., the transformed residual video block). Entropy encoder 110 may entropy encode the quantized residual video block. Entropy encoder 110 may output a bitstream that includes the quantized residual video block for decoding by a video decoder, e.g. video decoder 30.

Dequantization/inverse transform unit 112 may also receive the quantized, transformed coefficient and/or residual video blocks, and may inversely transform and dequantize the transformed coefficient and residual video blocks. The dequantized, inversely transformed video blocks may still have the second color space at this point. The result of the dequantization/inverse transform is reconstructed residual signal 126. Inverse adaptive color transformer 114 may inversely color transform the reconstructed residual signal based on the inverse color transform associated with the transform performed by adaptive color transformer 106. The resulting inversely adaptive color transformed coefficient and/or residual video blocks may have an RGB color space at this point.

Following application of an inverse color transformation to a residual video block, prediction compensator 116 may add back in a predictive block to the residual video block. Deblock filter 118 may deblock the resulting block. SAO filter 120 may perform SAO filtering. Reference picture memory 122 may then store the resulting reconstructed signal 128 for future use.

To color transform a video block of an input signal (i.e., unencoded video data), rather than a block of residual video data, switch 101 is flipped to the alternate position, and adaptive transformer 102 color transforms the input video block from a video block having an RGB color space to a second color space using a color transform of the one or more color transforms. Prediction with prediction processing unit 104 proceeds as described above, but the result may be fed to transform/quantization unit 108 directly because switch 105 is in the alternate position (as compared to the position illustrated in FIG. 8), rather than being color transformed by adaptive color transformer 106.

Transform/quantization unit 108, entropy encoder 110, and dequantization/inverse transform unit 112 may each operate as described above with respect to color transforming a residual video block, and reconstructed signal 126 is generated, and is also in the second color space. Reconstructed signal 126 is fed to prediction compensator 116 via switch 113. Switch 113 is in the alternate position to the position illustrated in FIG. 8, and inverse adaptive color transformer 114 is bypassed. Prediction compensator 116, deblock filter 118, and SAO filter 120 may operate as described above with respect to color transforming a residual video block to produce reconstructed signal 128. However, unlike reconstructed signal 128 described above, in this example, a block of reconstructed signal 128 may still have the second color space, rather than the RGB color space.

Reconstructed signal 128 may be fed to inverse adaptive color transformer 130 via switch 121, which is in the alternate position to that illustrated in FIG. 8. Inverse adaptive color transformer 130 may inversely color transform blocks of reconstructed signal 128 to blocks having an RGB color space, and reference picture memory 122 may store the blocks as blocks of a reference picture for future reference.

As described above, video encoder 21 may select a transform of the one or more color spaces to transform a first block of the video data having an RGB color space, to a second color space. In some examples, video encoder 21 selects the color transform adaptively by calculating rate-distortion costs associated with each of the color transforms. For instance, video encoder 21 may select the color transform of the plurality of color transforms that has the lowest associated distortion cost for a CU or block of a CU. Video encoder 21 may signal an index syntax element or other syntax data that indicates the selected color transform that has the lowest associated distortion cost.

In some examples, video encoder 21 may utilize a Lagrangian cost function that accounts for the tradeoff between the bitrate (e.g. the compression achieved) by the color transform, as well as the distortion (e.g., the loss of fidelity) associated with the color transform. In some examples, the Lagrangian cost corresponds to $L=D+\lambda R$, where L is the Lagrangian cost, D is the distortion, $\lambda$ is a Lagrange multiplier, and R is the bitrate. In some examples, video encoder 21 may signal an index syntax element that indicates the color transform of the plurality of color transforms that minimizes the Lagrangian cost.

In some high performance or high fidelity video coding applications or configurations, distortion should be minimized above minimizing bitrate. In such cases, when transforming video data from an RGB color space to a second color space, video encoder 21 may select the color transform, and the color space that results in the least distortion. Video encoder 21 may signal an index syntax element that indicates the selected color transform or color space that results in the least distortion.

In some other cases, video encoder 21 may calculate a cost of transforming blocks of an RGB color space to a second color space based on the correlation between each of the color components of the block of RGB video data and the color components of the block of the second color space. The color transform having the lowest associated cost may be the color transform that has color components that are most closely correlated with the RGB color components of the input signal. Video encoder 21 may signal an index syntax element that indicates the selected color transform that has the highest correlation between its color components and RGB color components.

It should be recognized that in some cases, video encoder 21 may select different color transforms for different CUs, LCUs, CTUs, or other units of video data. That is, for a single picture, video encoder 21 may select different color transforms associated with different color spaces. Selecting multiple different color transforms may better optimize coding efficiency and reduce rate distortion. To indicate which transform of the multiple transforms that video encoder 21 has selected for the current block, video encoder 21 may signal an index value corresponding to the selected color transform. Video encoder 21 may signal the index value at one or more of the first block of video a CTU, CU, PU, and a TU.

However, in some cases, video encoder 21 may determine a single color transform that is to be applied to one or a plurality of blocks, or a sequence of coded pictures, referred to as a CVS. In the case that only one color transform is selected, for each block, video encoder 21 may signal a flag syntax element. One value of the flag syntax element may indicate that video encoder 21 has applied the single transform to the current block or to all of the pictures in the CVS. The other value of the flag syntax element indicates that no transform has been applied to the current block. Video encoder 21 may determine whether or not to apply the color transform to each of the blocks of the picture on an individual basis, e.g. using the cost-based criteria described above.

In some examples, video encoder 21 determine whether to apply a pre-defined color transform of the plurality of inverse color transforms to each one of the plurality of blocks. For example, video encoder 21 and video decoder 31 may utilize a default pre-defined color transform/inverse color transform. Responsive to determining to apply the pre-defined color transform to each one of the plurality of blocks, video encoder 21 may transform each of the plurality of blocks using the pre-defined color transform without decoding data indicating that the pre-defined color transform has been applied to each one of the plurality blocks of video data.

In a reciprocal manner, video decoder 31 may be configured to determine whether to apply a pre-defined inverse color transform of the plurality of inverse color transforms to each one of the plurality of blocks. Responsive to determining to apply the pre-defined inverse color transform to each one of the plurality of blocks, video decoder 31 may inversely transform each of the plurality of blocks using the pre-defined color transform without decoding data indicating that the pre-defined color transform has been applied to each one of the plurality blocks of video data The color transforms of this disclosure may include, but are not necessarily limited to, an identity transform, a differential transform, a weighted differential transform, a DCT, a YCbCr transform, a YCgCo transform, and a YCgCo-R transform to the block of video data. A video coder configured in accordance with the techniques of this disclosure, such as video encoder 21, may apply one or more of these transforms and/or their inverses as well as other transforms, such as transforms to/from Adobe RGB, sRGB, scRGB, Rec. 709, Rec. 2020, Adobe Wide Gamut RGB, ProPhoto RGB, CMYK, Pantone, YIQ, YDbDr, YPbPr, xvYCC, ITU BT.601, ITU BT.709, HSV, and other color spaces, color spaces, and/or chroma subsampling formats not specifically described herein.

To apply a color transform to a block of video data having an RGB color space, video encoder 21 may multiply a 3×1 matrix comprising the Red, Green, and Blue color components of an RGB pixel with a color transform matrix. The result of the multiplication is a pixel having a second color space. The video coder may apply the color transform matrix to each pixel of the video block to produce a second block of pixels in a second color space. Various color transforms are now described in greater detail.

In some examples, video encoder 21 may apply an identity transform matrix or inverse identity transform matrix. The identity transform matrix comprises:

$$\begin{bmatrix} 1 & 0 & 0 \\ 0 & 1 & 0 \\ 0 & 0 & 1 \end{bmatrix},$$

and the inverse transform matrix, which video decoder 30 may apply, comprises:

$$\begin{bmatrix} 1 & 0 & 0 \\ 0 & 1 & 0 \\ 0 & 0 & 1 \end{bmatrix}.$$

When a video coder applies the identity transform, the resulting pixel value is identical to the input pixel value, i.e. applying the identity transform is equivalent to not applying a color transform at all. Video encoder 21 may select the identity transform when maintaining the RGB color space of the video blocks is required.

In another example, video encoder 21 may apply a differential transform matrix. The differential transform matrix comprises:

$$\begin{bmatrix} 0 & 1 & 0 \\ 0 & -1 & 1 \\ 1 & -1 & 0 \end{bmatrix}.$$

Video decoder 30 may apply a reciprocal, inverse differential matrix, which comprises:

$$\begin{bmatrix} 1 & 0 & 1 \\ 1 & 0 & 0 \\ 1 & 1 & 0 \end{bmatrix}.$$

In another example, video encoder 21 may be configured apply a weighted differential transform or inverse weighted differential transform. The weighted differential transform matrix comprises:

$$\begin{bmatrix} 0 & 1 & 0 \\ 0 & -\alpha & 1 \\ 1 & -\alpha_2 & 0 \end{bmatrix},$$

and the inverse, weighted differential matrix, which video decoder 31 may apply, comprises:

$$\begin{bmatrix} \alpha_2 & 0 & 1 \\ 1 & 0 & 0 \\ \alpha_1 & 1 & 0 \end{bmatrix}.$$

In the weighted differential transforms, $\alpha_1$ and $\alpha_2$ are parameters that a video coder may adjust. In some examples, video encoder 20 may calculate the parameters $\alpha_1$ and $\alpha_2$ according to the following equations:

$\alpha_1 = \text{cov}(G, B)/\text{var}(G)$, and $\alpha_2 = \text{cov}(G, R)/\text{var}(G)$.

Video encoder 21 may signal the values of $\alpha_1$ and $\alpha_2$ in the coded video bitstream in various examples.

In these equations, R corresponds to a red color channel, G corresponds to a green color channel, and B corresponds to a blue color channel of the RGB color space. In the differential transform equations, "cov( )" is the covariance function, and "var( )" is the variance function.

To determine the values of R, G, and B, an encoder or decoder may utilize a set of reference pixels in order to ensure that the covariance and variance functions have the same result or weight when calculated by the encoder or by the decoder. In some examples, the particular reference pixels may be signaled in the coded video bitstream (e.g. as syntax elements in a coded video bitstream). In other examples, the encoder and decoder may be preprogrammed to use certain reference pixels.

In some examples, video encoder 21 may restrict or constrain the values of $\alpha_1$ and $\alpha_2$ when transforming blocks using the differential transform. The video coder may constrain the values of $\alpha_1$ and $\alpha_2$ to a set of integers or dyadic numbers, e.g. ½, ¼, ⅛, etc. . . . In other examples, a video coder may restrict $\alpha_1$ and $\alpha_2$ to values of a fraction having a dyadic number, e.g. ⅛, 2/8, ⅜, . . . , ⅝. A dyadic number or dyadic fraction is a rational number having a denominator that is a power of two, and where the numerator is an integer. Restricting the values of $\alpha_1$ and $\alpha_2$ may improve the bitstream efficiency of coding $\alpha_1$ and $\alpha_2$.

In other examples, video encoder 21 may be configured to transform a block having an RGB color space to generate a second block, using a DCT transform. The DCT transforms samples of a block to express the samples as a sum of sinusoids of different frequencies and amplitudes. A DCT transform or inverse transform may transform pixel to and from a finite sequence of data points in terms of a sum of cosine functions. The DCT transform matrix corresponds to:

$$\begin{bmatrix} 0.5774 & 0.5774 & 0.5774 \\ 0.7071 & 0 & -0.7071 \\ 0.4082 & -0.8156 & 0.4082 \end{bmatrix}.$$

In a reciprocal manner, video decoder 31 may be configured to apply an inverse transform to blocks transformed using the DCT revert the blocks back to the original samples. The inverse DCT transform matrix corresponds to:

$$\begin{bmatrix} 0.5774 & 0.7071 & 0.4082 \\ 0.5774 & 0 & -0.8156 \\ 0.5774 & -0.7071 & 0.4082 \end{bmatrix}.$$

Video encoder 21 may also apply a YCbCr transform to a block having an RGB color space to produce a block having a YCbCr color space. As described above, the YCbCr color space includes a luma (Y) component, as well as blue chrominance (Cb) and red chrominance (Cr) components. The YCbCr transform matrix may correspond to:

$$\begin{bmatrix} 0.2126 & 0.7152 & 0.0722 \\ -0.1172 & -0.3942 & 0.5114 \\ 0.5114 & -0.4645 & -0.0469 \end{bmatrix}.$$

Video decoder 31 may be configured to apply an inverse YCbCr transform to convert a block having a YCbCbr color space to a block having an RGB color space. The inverse YCbCr transform matrix may correspond to:

$$\begin{bmatrix} 1 & 0 & 1.5397 \\ 1 & -0.1831 & -0.4577 \\ 1 & 1.8142 & 0 \end{bmatrix}.$$

Video encoder 21 may also apply a YCgCo transform to a block having an RGB color space to produce a block having a YCgCo color space. A YCgCo color space includes a luma (Y) component, as well as green chrominance (Cg) and orange chrominance (Co) components. The YCgCo transform matrix may correspond to:

$$\begin{bmatrix} 0.2126 & 0.7152 & 0.0722 \\ -0.1172 & -0.3942 & 0.5114 \\ 0.5114 & -0.4645 & -0.0469 \end{bmatrix}.$$

Video decoder 31 may be configured to apply an inverse YCgCo transform to convert a block having a YCgCo color space to a block having an RGB color space. The inverse YCgCo transform matrix may correspond to:

$$\begin{bmatrix} 1 & 0 & 1.5397 \\ 1 & -0.1831 & -0.4577 \\ 1 & 1.8142 & 0 \end{bmatrix}.$$

Video encoder 21 may also be configured to apply a YCgCo-R transform to a block having an RGB color space to produce a block having a YCgCo-R color space. The YCgCo-R color space includes a luma (Y) component, as well as green chrominance (Cg) and orange chrominance (Co) components. Unlike the YCgCo transform described above, however, the YCgCg-R transform is reversible, e.g. the YCgCo-R transform may not produce any distortion, for example due to rounding errors.

The YCbCr transform matrix may correspond to:

$Co=R-B$ $t=B+[Co/2]$ $Cg=G-t$ $Y=t+[Cg/2]$.

Video decoder 31 may be configured to apply an inverse YCgCo-R transform. The YCgCo-R inverse transform inversely transforms blocks having a YCgCo-R color space to blocks having an RGB color space. The inverse YCgCo-R transform matrix may correspond to:

$t=Y-[Cg/2]$ $G=Cg+t$ $B=t-[Co/2]$ $R=B+Co$.

In order to apply any of the color transforms described herein, video encoder 21 may implement a lifting scheme that has flexible parameters. A lifting scheme is a technique of decomposing a discrete wavelet transform into a finite sequence of simple filtering steps, referred to as lifting steps or as ladder structures. Video encoder 21 may signal the parameters in the coded video bitstream, or video encoder 21 may derive the parameters may be derive the parameters the same way. One example of a lifting scheme is as follows:

$R'=R+[aB]$ $B'=B+[bR']$ $G'=G+[cB']$ $R''=R'+[dG']$, where a, b, c, and d are parameters as described above. In this lifting scheme, R, G, and B are red, green, and blue color channels or samples, respectively. As with the a parameters described above with respect to the weighted differential transform, the values of a, b, c, and d may be restricted or limited, e.g. so the signs can only be positive or negative. In some cases, there may be additional steps in the lifting scheme, such as:

$R'''=[eR''+f]$ $B''=[gB'+h]$, $G''=[iG'+j]$, where f, g, h, i, and j are parameters. When using the lifting scheme, as well as in other examples, the video encoder 20 and video decoder 30 can normalize the output depth of the three components, R''', B'', and G'' can be normalized within a pre-determined bit depth, which may not necessarily be the same for each component.

Figure 9:
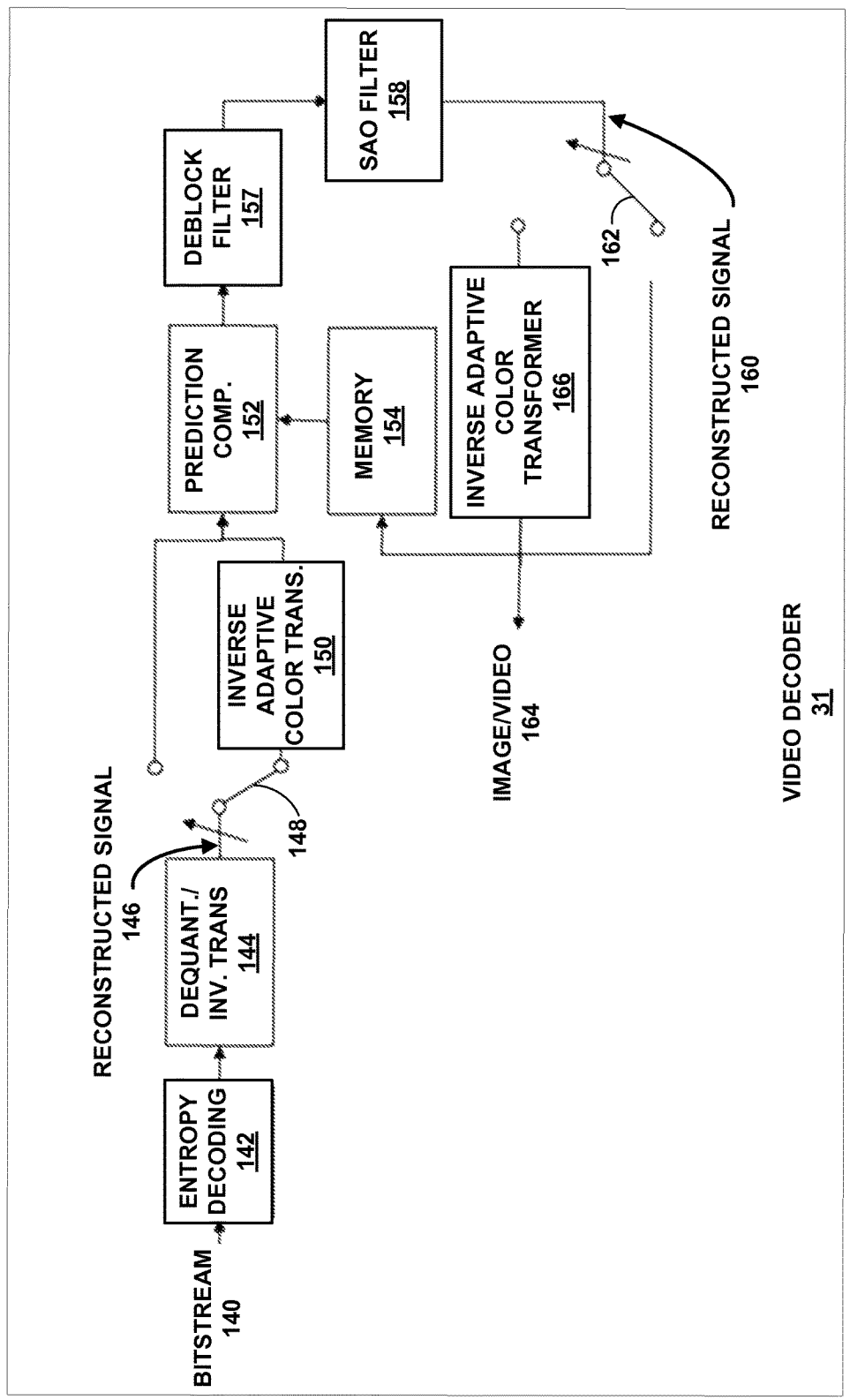
FIG. 9 is a block diagram illustrating another example of a video decoder that may utilize techniques for inversely transforming a block of video data having a first color space to a block of video data video data having a second, RGB color space using an inverse color transform in accordance with one or more aspects of this disclosure.

FIG. 9 is a block diagram illustrating another example video decoder 31 that may utilize techniques for inversely transforming video data having a first color space to video data having a second, RGB color space using an inverse color transform in accordance with one or more aspects of this disclosure.

FIG. 9 illustrates a more detailed version of video decoder 31 relative to video decoder 30 of FIG. 1 and FIG. 7. Indeed, in some examples video decoder 31 may be considered a more specific example of video decoder 30 (FIG. 7) and/or video decoder 30 (FIG. 1). The example of FIG. 9 illustrates two possible examples for implementing the techniques of this disclosure. In the first implementation, video decoder 31 adaptively inversely transforms a block of an input video signal from a first color space (e.g., a non-RGB color space) to a second block having a second, RGB color space using an inverse color transform of a plurality of inverse color transforms. The second illustrated example performs the same techniques, but performs the inverse color transformation on blocks of residual video data, rather than on an input signal.

In the example of FIG. 9, video decoder 31 is shown as performing inverse color transforms on blocks of residual video data example because of the way switches 145, and 156 are currently switched. If switches 145 and 156 are switched the alternative position, video decoder 31 is configured to inversely color transform blocks of input video data having a first representation to a blocks of video data having a second, RGB color space, rather than inversely transforming blocks of residual video data.

The process of performing inverse color transforms on blocks of residual video data as illustrated in FIG. 9 is now described in detail. In the example of FIG. 9, an encoded input bitstream 140 (also referred to as an input signal) is passed to entropy decoding unit 142. Entropy decoding unit 142 may entropy decode bitstream 140 to produce a quantized block of residual video data having a first color space. For instance, entropy decoding unit 142 may entropy decode particular syntax elements included in bitstream 140. Dequantization/inverse transform unit 144 may dequantize a transform coefficient block. Additionally, dequantization/inverse transform unit 144 may apply an inverse transform to the transform coefficient block to determine a transform block comprising residual video data. Thus, dequantization/inverse transform unit 144 may dequantize and inversely transform blocks of entropy decoded video data of bitstream 140. When video decoder 31 is configured to inversely color transform blocks of residual data, switch 148 feeds a block of residual video data having a first color space to inverse adaptive color transformer 150. In this way, inverse adaptive color transformer 150 may receive a transform block of a TU.

Inverse adaptive color transformer 150 may adaptively inversely transform a block of video data having the first color space to a second block of video data having a second, RGB color space. For example, inverse adaptive color transformer 150 may select an inverse transform to apply to a transform block of a TU. In this example, inverse adaptive color transformer 150 may apply the selected inverse transform to the transform block in order to transform the transform block from the first color space to the RGB color space. Prediction compensation unit 152 may combine a reference picture from reference picture memory 154. For example, prediction compensation unit 152 may receive a transform block of a TU of a CU. In this example, prediction compensation unit 152 may determine a coding block for the CU. In this example, each sample of the coding block of the CU may be equal to a sum of a sample in the transform block and a corresponding sample in a prediction block for a PU of the CU. Deblock filter 157 may deblock the combined, reconstructed image. SAO filter unit 158 may perform additional SAO filtering if applicable.

The output of SAO filter unit 158 is reconstructed signal 160. If video decoder 31 is configured to inversely color transform blocks of residual video data, switch 162 feeds reconstructed signal 160 to reference picture memory 154 for future use as a reference picture. Video decoder 31 may also output reconstructed signal 160 as image/video 164.

In examples where video decoder 31 is configured to inversely color transform blocks of the original input signal as opposed to blocks of residual video data, entropy decoding unit 142 and dequantization/inverse transform unit 144 operate in the manner previously described. Switch 148 is in the alternate position and feeds reconstructed residual signal directly to prediction compensation unit 152. At this point, the residual block provided to prediction compensation unit 152 is still in the first color space, rather than the RGB color space.

Prediction compensation unit 152 may reconstruct a block of the original image and may combine the residual block with one or more blocks of pictures from reference picture memory 154. Deblock filter 157 and SAO filter unit 158 may operate as described above with respect to inversely transforming residual blocks of video data. The output of SAO filter unit 158 is reconstructed signal 160, the blocks of which are still in the first color space, and may not be have the RGB color space (e.g., the blocks may still have the RGB color space if the identity transform was used).

Reconstructed signal 160 may be fed to inverse adaptive color transformer 166 via switch 162, which is in the alternate position as compared to the position illustrated in FIG. 9. Inverse adaptive color transformer 166 may inversely color transform a block of reconstructed signal having a first color space to a second block of video data having a second, RGB color space using an inverse color transform of one or more inverse color transforms. In some examples, the particular inverse transform that decoder 31 uses may be signaled in bitstream 140. Inverse adaptive color transformer 166 may feed the second block having the second color space for output as image/video 164, as well as to reference picture memory 154 for future storage and usage as a reference picture.

Figure 10:
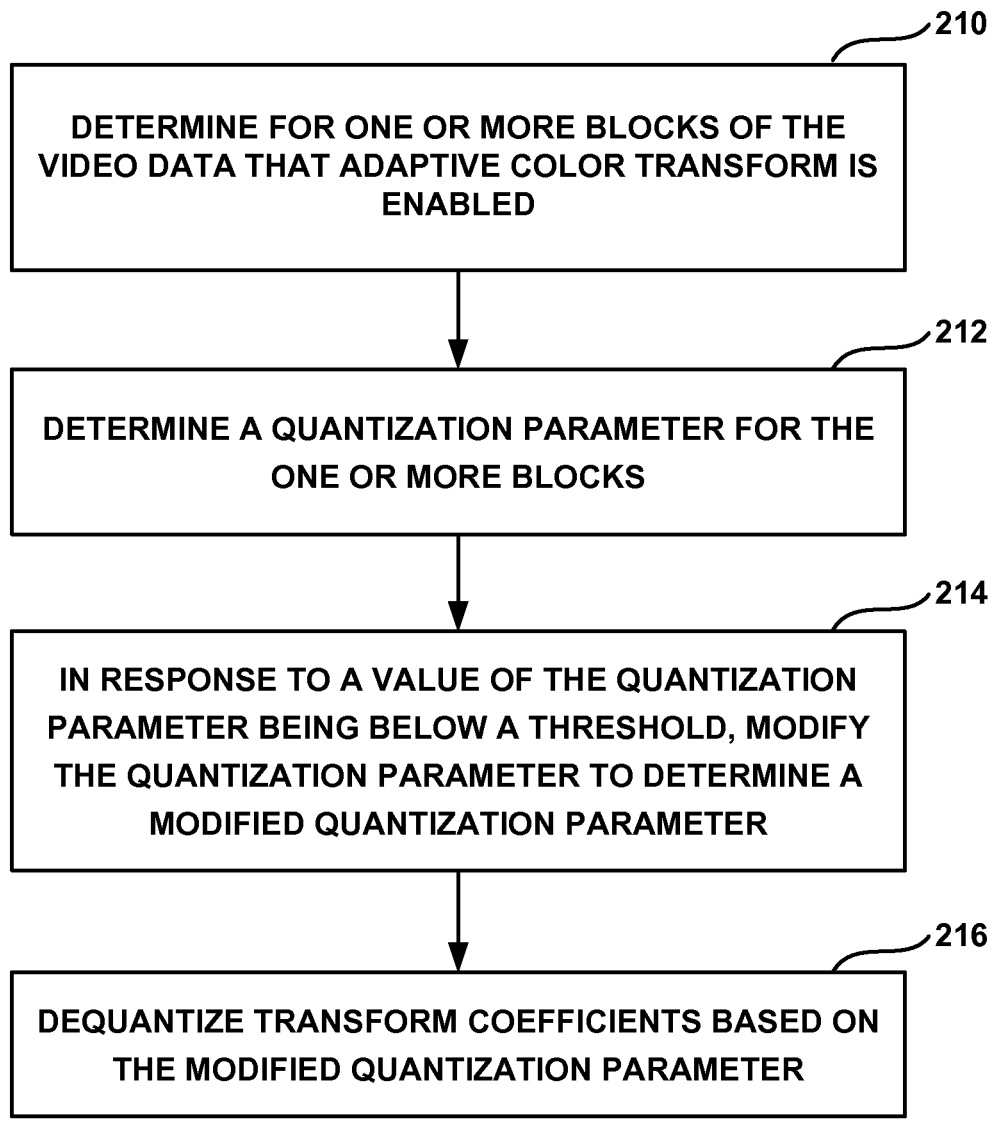
FIG. 10 is a flowchart illustrating an example video decoding method according to the techniques of this disclosure.

FIG. 10 shows an example of a method of decoding video data in accordance with the techniques of this disclosure. The techniques of FIG. 10 will be described with respect to a generic video decoder. The generic video decoder may, for example, correspond to video decoder 30 of FIG. 7 or video decoder 31 of FIG. 9, although the techniques of FIG. 10 are not limited to any particular type of video decoder. As video encoders typically perform video decoding as part of the encoding process, the techniques of FIG. 10 may also be performed by a video encoder, such as video encoder 20 of FIG. 6 and video encoder 21 of FIG. 8. Video encoder 20, for example, includes inverse quantization unit 58 and inverse transform processing unit 60, which form part of a decoding loop, in which the techniques of FIG. 10 may be implemented. Thus, while the techniques of FIG. 10 will be explained with reference to a video decoder, it should be understood that this video decoder may be part of a video encoder.

In the example of FIG. 10, the video decoder determines for one or more blocks of the video data that adaptive color transform is enabled (210). In some examples, the video decoder may determine for the one or more blocks of the video data that adaptive color transform is enabled by receiving a syntax element that indicates if adaptive color transform is enabled. The syntax element may, for example, be received in the PPS or at another level. By parsing the received syntax element, the video decoder can determine if adaptive color transform is enabled or disabled. In other examples, the video decoder may determine for the one or more blocks of the video data that adaptive color transform is enabled by determining a chroma format for the video data. For example, in response to determining a chroma format for the video data is 4:4:4, the video decoder may determine that adaptive color transform is enabled. In response to determining a chroma format for the video data is other than 4:4:4, the video decoder may determine that adaptive color transform is disabled.

For video data with adaptive color transform enabled, the video decoder may determine a quantization parameter for the one or more blocks (212). In response to a value of the quantization parameter being below a threshold, the video decoder may modify the quantization parameter to determine a modified quantization parameter (214). The threshold may, for example, be zero, and a value of the modified quantization parameter may be greater than or equal to zero. The modified quantization parameter may be less than or equal to 51 plus an offset value. To modify the quantization parameter, the video decoder may add an offset value to the quantization parameter. The video decoder may receive a flag to indicate if the offset value is to be added to the quantization parameter.

The video decoder may, for example, receive the offset value as a syntax element. The offset value may be an offset to the quantization parameter (when adaptive color transform is enabled for the block). The video decoder may dequantize transform coefficients based on the modified quantization parameter (216).

Figure 11:
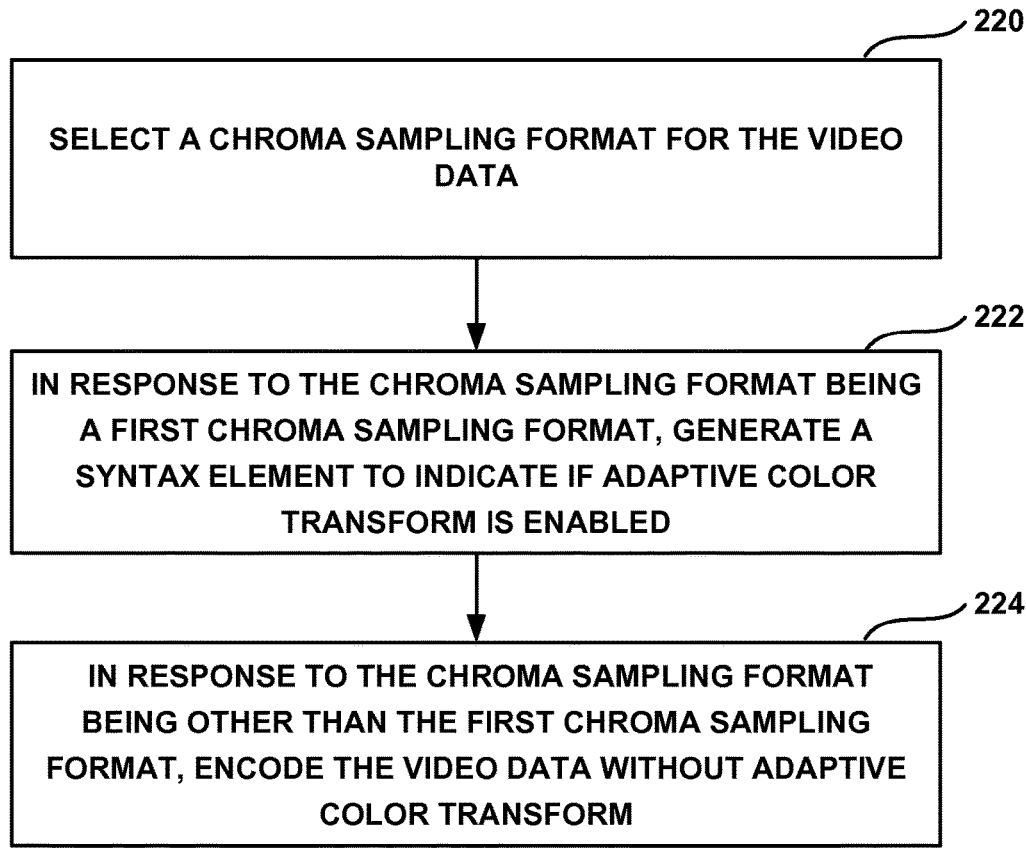
FIG. 11 is a flowchart illustrating an example video encoding method according to the techniques of this disclosure.

FIG. 11 shows an example of a method of encoding video data in accordance with the techniques of this disclosure. The techniques of FIG. 11 will be described with respect to a generic video encoder. The generic video encoder may, for example, correspond to video encoder 20 of FIG. 6 or video encoder 21 of FIG. 8, although the techniques of FIG. 11 are not limited to any particular type of video encoder. The video encoder selects a chroma sampling format for the video data (220). In response to the chroma sampling format being a first chroma sampling format, the video encoder generates a syntax element to indicate if adaptive color transform is enabled (222). In response to the chroma sampling format being other than the first chroma sampling format, the video encoder encodes the video data without adaptive color transform (224). The first chroma sampling format may, for example, be a 4:4:4 chroma sampling format.

Figure 12:
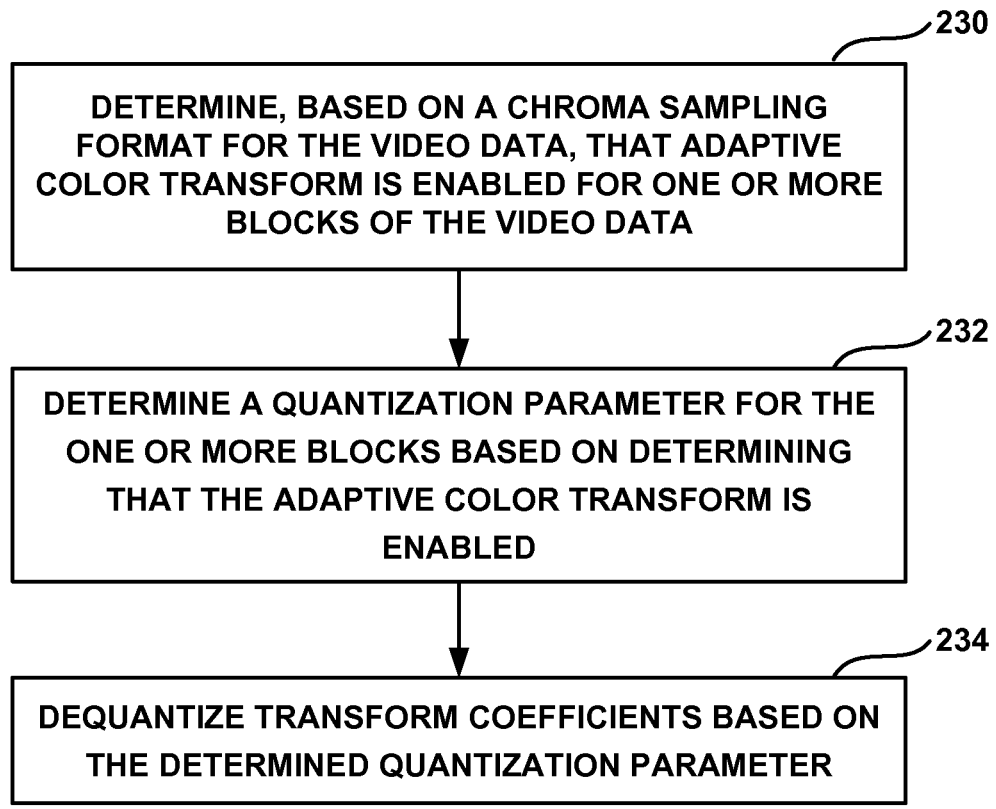
FIG. 12 is a flowchart illustrating an example video decoding method according to the techniques of this disclosure.

FIG. 12 shows an example of a method of decoding video data in accordance with the techniques of this disclosure. The techniques of FIG. 12 will be described with respect to a generic video decoder. The generic video decoder may, for example, correspond to video decoder 30 of FIG. 7 or video decoder 31 of FIG. 9, although the techniques of FIG. 12 are not limited to any particular type of video decoder. The generic video decoder may also correspond to a decoding loop of a video encoder, in some examples.

In the example of FIG. 12, the video decoder determines, based on a chroma sampling format for the video data, that adaptive color transform is enabled for one or more blocks of the video data (230). The video decoder may, for example, determine that adaptive color transform is enabled for one or more blocks of the video data by determining the chroma sampling format is a 4:4:4 sampling format. The video decoder may determine a quantization parameter for the one or more blocks based on determining that the adaptive color transform is enabled (232) and dequantize transform coefficients based on the determined quantization parameter (234).

The video decoder may also, for example, determine for one or more second blocks of the video data that a chroma sampling format for the video blocks is a chroma sampling format other than 4:4:4 and based on the chroma sampling format being other than 4:4:4, determining that adaptive color transform is disabled for the second one or more blocks. The video decoder may, for example, determine that adaptive color transform is disabled for the second one or more blocks without receiving a syntax element other than the indication of the chroma sampling format, to indicate if adaptive color transform is disabled.

Figure 13:
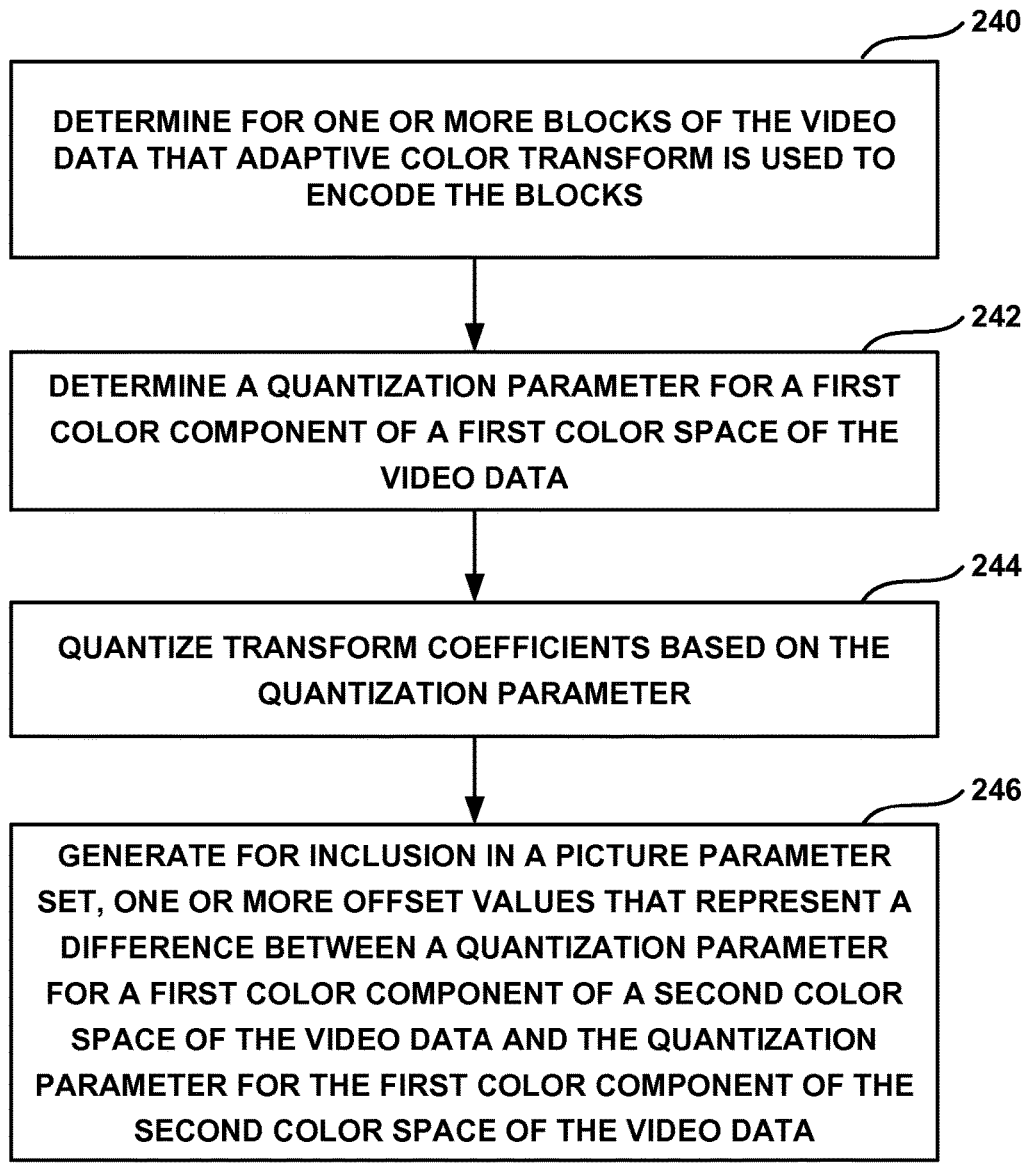
FIG. 13 is a flowchart illustrating an example video encoding method according to the techniques of this disclosure.

FIG. 13 shows an example of a method of encoding video data in accordance with the techniques of this disclosure. The techniques of FIG. 13 will be described with respect to a generic video encoder. The generic video encoder may, for example, correspond to video encoder 20 of FIG. 6 or video encoder 21 of FIG. 8, although the techniques of FIG. 13 are not limited to any particular type of video encoder. The video encoder determines for one or more blocks of the video data that adaptive color transform is used to encode the blocks (240). The video encoder determines a quantization parameter for a first color component of a first color space of the video data (242). The video encoder quantizes transform coefficients based on the quantization parameter (244). The video encoder generates for inclusion in a picture parameter set, one or more offset values that represent a difference between a quantization parameter for a first color component of a second color space of the video data and the quantization parameter for the first color component of the second color space of the video data (246).

Figure 14:
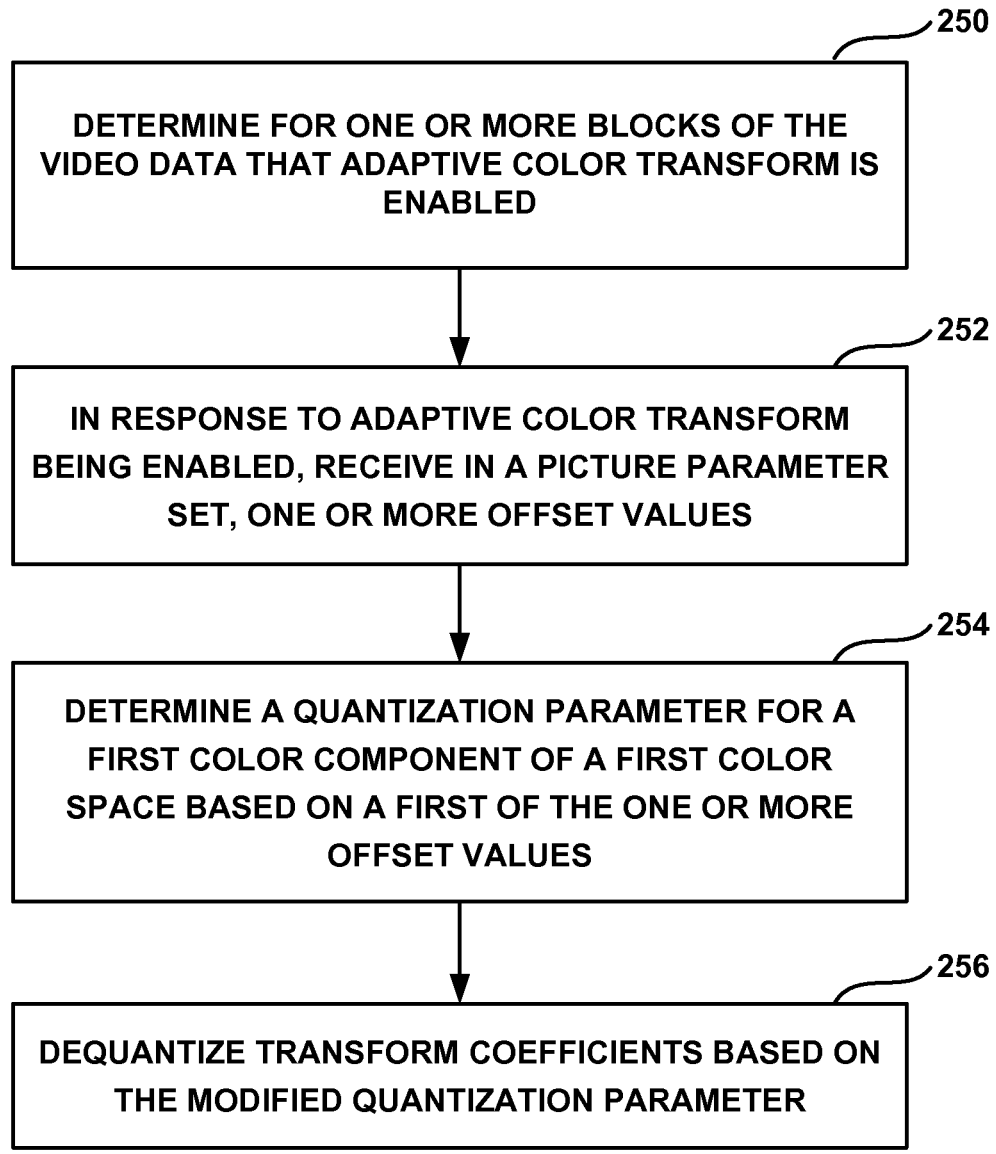
FIG. 14 is a flowchart illustrating an example video decoding method according to the techniques of this disclosure.

FIG. 14 shows an example of a method of decoding video data in accordance with the techniques of this disclosure. The techniques of FIG. 14 will be described with respect to a generic video decoder. The generic video decoder may, for example, correspond to video decoder 30 of FIG. 7 or video decoder 31 of FIG. 9, although the techniques of FIG. 14 are not limited to any particular type of video decoder. In the example of FIG. 14, the video decoder determines for one or more blocks of the video data that adaptive color transform is enabled (250). In response to adaptive color transform being enabled, the video decoder receives in a picture parameter set, one or more offset values (252). The video decoder determines a quantization parameter for a first color component of a first color space based on a first of the one or more offset values (254) and dequantizes transform coefficients based on the modified quantization parameter (256). The one or more offset values may include an offset value for the first color component, an offset value for a second color component, and an offset value for a third color component.

The video decoder may determine a quantization parameter for a first color component of a second color space. To determine the quantization parameter for the first color component of the first color space based on the first of the one or more offset values, the video decoder may convert the quantization parameter for the first color component of the second color space to the quantization parameter for the first color component of the first color space by adding the first of the one or more offset values to the quantization parameter for the first color component of the second color space.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving an offset value in the video data;
   determining for one or more blocks of the video data that adaptive color transform is enabled;
   determining a red, green, and blue (RGB)-color space quantization parameter for the one or more blocks, wherein determining the RGB-color space quantization parameter comprises adding the offset value to a luma-chroma (YCbCr)-color space quantization parameter;
   in response to a value of the RGB-color space quantization parameter being below a threshold, modifying the RGB-color space quantization parameter to determine a modified RGB-color space quantization parameter; and
   dequantizing transform coefficients of a block from the one or more blocks based on the modified RGB-color space quantization parameter.

2. The method of claim 1, wherein determining for the one or more blocks of the video data that adaptive color transform is enabled comprises determining a chroma format for the video data.

3. The method of claim 2, wherein determining for the one or more blocks of the video data that adaptive color transform is enabled comprises:
   in response to determining a chroma format for the one or more blocks of the video data is 4:4:4, determining that adaptive color transform is enabled for the one or more blocks.

4. The method of claim 2, further comprising:
   for one or more additional blocks, in response to determining a chroma format of the one or more additional blocks is other than 4:4:4, determining that adaptive color transform is disabled for the one or more additional blocks.

5. The method of 1, wherein determining for the one or more blocks of the video data that adaptive color transform is enabled comprises parsing a syntax element in the video data, wherein the syntax element indicates if adaptive color transform is enabled.

6. The method of claim 5 wherein the syntax element is signalled in a picture parameter set (PPS).

7. The method of claim 1, wherein the threshold is zero and wherein a value of the modified quantization parameter is greater than or equal to zero.

8. The method of claim 1, wherein the modified RGB-color space quantization parameter is less than or equal to 51 plus the offset value.

9. The method of claim 1, further comprising:
   receiving a flag indicating the offset value is to be added to the quantization parameter.

10. The method of claim 1, further comprising:
    based on the dequantized transform coefficients, determining a residual block for the video data;
    determining a predictive block;
    adding the residual block to a predictive block to determine a reconstructed block of video data.

11. The method of claim 1, wherein the method of decoding the video data is performed as part of a video encoding process.

12. The method of claim 1, further comprising:
receiving the video data at a receiver of a wireless communication device;
storing the video data in a memory of the wireless communication device; and
processing the video data on one or more processors of the wireless communication device.

13. A device for decoding video data, the device comprising:
a video data memory;
one or more processors configured to:
receive an offset value in the video data;
determine for one or more blocks of the video data that adaptive color transform is enabled;
determine a red, green, and blue (RGB)-color space quantization parameter for the one or more blocks, wherein determining the RGB-color space quantization parameter comprises adding the offset value to a luma-chroma (YCbCr)-color space quantization parameter;
in response to a value of the RGB-color space quantization parameter being below a threshold, modify the RGB-color space quantization parameter to determine a modified RGB-color space quantization parameter; and
dequantize transform coefficients of a block from the one or more blocks based on the modified RGB-color space quantization parameter.

14. The device of claim 13, wherein to determine for the one or more blocks of the video data that adaptive color transform is enabled, the one or more processors are further configured to determine a chroma format for the video data.

15. The device of claim 14, wherein to determine for the one or more blocks of the video data that adaptive color transform is enabled, the one or more processors are further configured to:
in response to determining a chroma format for the one or more blocks of the video data is 4:4:4, determine that adaptive color transform is enabled for the one or more blocks.

16. The device of claim 14, wherein the one or more processors are further configured to:
for one or more additional blocks, in response to determining a chroma format for the one or more additional blocks is other than 4:4:4, determine that adaptive color transform is disabled for the one or more additional blocks.

17. The device of claim 13, wherein to determine for the one or more blocks of the video data that adaptive color transform is enabled, the one or more processors are further configured to parse a syntax element in the video data, wherein the syntax element indicates if adaptive color transform is enabled.

18. The device of claim 17, wherein the syntax element is signalled in a picture parameter set (PPS).

19. The device of claim 13, wherein the threshold is zero and wherein a value of the modified quantization parameter is greater than or equal to zero.

20. The device of claim 13, wherein the modified RGB-color space quantization parameter is less than or equal to 51 plus the offset value.

21. The device of claim 13, wherein the one or more processors are further configured to receive a flag indicating the offset value is to be added to the quantization parameter.

22. The device of claim 13, wherein the one or more processors are further configured to:
based on the dequantized transform coefficients, determining a residual block for the video data;
determining a predictive block;
adding the residual block to a predictive block to determine a reconstructed block of video data.

23. The device of claim 13, where the one or more processors are further confiugred to decode the video data, and wherein the device further comprises a display configured to display the decoded video data.

24. The device of claim 13, where the one or more processors are further confiugred to encode the video data, and wherein the device further comprises a camera configured to acquire the video data.

25. The device of claim 13, wherein the device comprises a wireless communication device, the device further comprising a receiver configured to receive the video data.

26. The device of claim 25, wherein the wireless communication device comprises a telephone handset and wherein the receiver is configured to demodulate, according to a wireless communication standard, a signal comprising the video data.

27. An apparatus for decoding video data, the apparatus comprising:
means for receiving an offset value in the video data;
means for determining for one or more blocks of the video data that adaptive color transform is enabled;
means for determining a red, green, and blue (RGB)-color space quantization parameter for the one or more blocks, wherein determining the RGB-color space quantization parameter comprises adding the offset value to a luma-chroma (YCbCr)-color space quantization parameter;
means for modifying the RGB-color space quantization parameter to determine a modified RGB-color space quantization parameter in response to a value of the RGB-color space quantization parameter being below a threshold; and
means for dequantizing transform coefficients of a block from the one or more blocks based on the modified RGB-color space quantization parameter.

28. A non-transitory computer-readable storage medium storing instructions that when executed by one or more processors cause the one or more processors to:
receive in the video data an offset value;
determine for one or more blocks of the video data that adaptive color transform is enabled;
determine a red, green, and blue (RGB)-color space quantization parameter for the one or more blocks, wherein determining the RGB-color space quantization parameter comprises adding an offset to a luma-chroma (YCbCr)-color space quantization parameter;
modify the RGB-color space quantization parameter to determine a modified RGB-color space quantization parameter in response to a value of the RGB-color space quantization parameter being below a threshold; and
dequantize transform coefficients of a block from the one or more blocks based on the modified RGB-color space quantization parameter.

* * * * *